(12) United States Patent
Lee et al.

(10) Patent No.: US 12,279,296 B2
(45) Date of Patent: Apr. 15, 2025

(54) METHOD, USER EQUIPMENT, DEVICE, AND STORAGE MEDIUM FOR PERFORMING UPLINK TRANSMISSION, AND METHOD AND BASE STATION FOR PERFORMING UPLINK RECEPTION

(71) Applicant: LG ELECTRONICS INC., Seoul (KR)

(72) Inventors: Hyunho Lee, Seoul (KR); Suckchel Yang, Seoul (KR); Seonwook Kim, Seoul (KR); Changhwan Park, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 544 days.

(21) Appl. No.: 17/598,759

(22) PCT Filed: Mar. 27, 2020

(86) PCT No.: PCT/KR2020/004245
§ 371 (c)(1),
(2) Date: Sep. 27, 2021

(87) PCT Pub. No.: WO2020/197333
PCT Pub. Date: Oct. 1, 2020

(65) Prior Publication Data
US 2022/0248410 A1 Aug. 4, 2022

Related U.S. Application Data

(60) Provisional application No. 62/847,848, filed on May 14, 2019.

(30) Foreign Application Priority Data

Mar. 28, 2019 (KR) .................. 10-2019-0035954
May 3, 2019 (KR) .................. 10-2019-0052015
(Continued)

(51) Int. Cl.
*H04W 72/56* (2023.01)
*H04L 5/00* (2006.01)
(Continued)

(52) U.S. Cl.
CPC ........... *H04W 72/56* (2023.01); *H04L 5/0044* (2013.01); *H04W 72/0446* (2013.01); *H04W 72/21* (2023.01)

(58) Field of Classification Search
None
See application file for complete search history.

(56) References Cited

U.S. PATENT DOCUMENTS

2011/0269448 A1\* 11/2011 Chen .................. H04W 48/12
455/422.1
2013/0114455 A1 5/2013 Yoo et al.
(Continued)

FOREIGN PATENT DOCUMENTS

AU 2017437132 A1 \* 5/2020 ........... H04L 1/0009
AU 2018403272 A1 \* 9/2020 ........... H04L 1/0009
(Continued)

OTHER PUBLICATIONS

Huawei, "UCI enhancements for URLLC." 3GPP TSG RAN WG1 Meeting #96, Athens, Greece, Feb. 25-Mar. 1, 2019, R1-1903234.\*
(Continued)

*Primary Examiner* — Andrew C Oh
(74) *Attorney, Agent, or Firm* — BRYAN CAVE LEIGHTON PAISNER LLP

(57) ABSTRACT

According to an aspect of the present disclosure, a method for transmitting an uplink signal by a user equipment in a
(Continued)

wireless communication system comprises: receiving information on a plurality of PUCCH resource sets; and on the basis of a first PUCCH resource associated with a first uplink signal and a second PUCCH resource associated with a second uplink signal, which overlap on a time domain, multiplexing the first uplink signal and the second uplink signal to a PUCCH resource included in one PUCCH resource set among the plurality of PUCCH resource sets, wherein the plurality of PUCCH resource sets are configured to have priorities, and the one PUCCH resource set is a PUCCH resource set having the highest priority from among the plurality of PUCCH resource sets.

9 Claims, 18 Drawing Sheets

(30) Foreign Application Priority Data

Jul. 17, 2019 (KR) .................. 10-2019-0086250
Nov. 6, 2019 (KR) .................. 10-2019-0141238

(51) Int. Cl.
*H04W 72/0446* (2023.01)
*H04W 72/21* (2023.01)

(56) References Cited

U.S. PATENT DOCUMENTS

| | | | | |
|---|---|---|---|---|
| 2014/0169204 | A1* | 6/2014 | Cheng | H04W 24/10 370/252 |
| 2016/0295573 | A1* | 10/2016 | Lee | H04L 5/001 |
| 2017/0223694 | A1* | 8/2017 | Han | H04W 16/32 |
| 2017/0230913 | A1* | 8/2017 | Ouchi | H04J 11/0023 |
| 2017/0237478 | A1 | 8/2017 | Kwak et al. | |
| 2017/0290041 | A1* | 10/2017 | Rico Alvarino | H04W 72/23 |
| 2017/0373800 | A1* | 12/2017 | Lee | H04L 1/1861 |
| 2018/0019206 | A1* | 1/2018 | Nagai | H01L 23/5283 |
| 2018/0049206 | A1* | 2/2018 | Yerramalli | H04W 16/14 |
| 2018/0310298 | A1* | 10/2018 | Li | H04L 1/1812 |
| 2019/0037586 | A1* | 1/2019 | Park | H04L 5/00 |
| 2019/0053206 | A1* | 2/2019 | Babaei | H04W 72/23 |
| 2019/0068317 | A1* | 2/2019 | Babaei | H04L 1/1812 |
| 2019/0103947 | A1* | 4/2019 | Park | H04L 1/1861 |
| 2019/0159140 | A1* | 5/2019 | Wang | H04W 52/325 |
| 2019/0223036 | A1* | 7/2019 | Lunttila | H04L 5/0064 |
| 2019/0246432 | A1* | 8/2019 | Hosseini | H04W 74/0816 |
| 2019/0379489 | A1* | 12/2019 | Hwang | H04L 1/0063 |
| 2020/0178244 | A1* | 6/2020 | Kim | H04L 1/1861 |
| 2020/0344770 | A1* | 10/2020 | Yuan | H04B 7/088 |
| 2020/0358504 | A1* | 11/2020 | Takeda | H04L 5/0055 |
| 2020/0359374 | A1* | 11/2020 | Gao | H04W 72/54 |
| 2020/0404692 | A1* | 12/2020 | Yin | H04L 1/1887 |
| 2021/0058919 | A1* | 2/2021 | Takeda | H04W 72/0446 |
| 2021/0227537 | A1* | 7/2021 | Yamamoto | H04L 1/001 |
| 2021/0377991 | A1* | 12/2021 | Takeda | H04W 72/569 |

FOREIGN PATENT DOCUMENTS

| | | | | |
|---|---|---|---|---|
| CN | 106067845 A | * | 11/2016 | ............ H04L 1/00 |
| CN | 111263448 A | * | 6/2020 | |
| CN | 111277376 A | * | 6/2020 | |
| CN | 111278143 A | * | 6/2020 | |
| CN | 113632401 A | * | 11/2021 | ........... H04L 1/1854 |
| CN | 111181706 B | * | 12/2021 | |
| EP | 2385647 A2 | * | 11/2011 | ............. H04L 1/16 |
| EP | 2466947 A1 | * | 6/2012 | ........... H04L 5/0057 |
| EP | 3512146 A1 | * | 7/2019 | ........... H04B 7/0626 |
| WO | WO-2013112004 A1 | * | 8/2013 | ........... H04L 1/0026 |
| WO | WO-2013166684 A1 | * | 11/2013 | ............ H04L 1/18 |
| WO | WO-2016123372 A1 | * | 8/2016 | ........... H04L 1/0026 |
| WO | WO-2017189034 A1 | * | 11/2017 | ........... H04L 5/0096 |
| WO | WO-2018074688 A1 | * | 4/2018 | ............. H04L 27/26 |
| WO | WO-2018227164 A1 | * | 12/2018 | ........... H04L 1/0026 |
| WO | WO-2018230999 A1 | * | 12/2018 | ............. H04L 1/16 |
| WO | WO-2019082247 A1 | * | 5/2019 | |
| WO | WO-2019083249 A1 | * | 5/2019 | ............. H04L 5/00 |
| WO | WO-2019095502 A1 | * | 5/2019 | |
| WO | WO-2019098798 A1 | * | 5/2019 | ........... H04B 7/0626 |
| WO | WO-2019143131 A1 | * | 7/2019 | ........ H04W 72/0406 |
| WO | WO-2019147000 A1 | * | 8/2019 | ........... H04L 5/0007 |
| WO | WO-2019163138 A1 | * | 8/2019 | ........... H04L 1/1861 |
| WO | WO-2020053978 A1 | * | 3/2020 | ........... H04L 1/1812 |
| WO | WO-2020059150 A1 | * | 3/2020 | |

OTHER PUBLICATIONS

Nokia, "On intra-UE DL/UL prioritization for NR URLLC." 3GPP TSG RAN WG1 Meeting #96, Athens, Greece, Feb. 25- Mar. 1, 2019, R1-1901917.*
R1-1901693: 3GPP TSG RAN WG1 Meeting #96, Athens, Greece, Feb. 25-Mar. 1, 2019, vivo, "UCI enhancement for URLLC," (9 Pages).
R1-1903234: 3GPP TSG RAN WG1 Meeting #96, Athens, Greece, Feb. 25-Mar. 1, 2019, Huawei, HiSilicon, "UCI enhancement for URLLC," (9 Pages).
R1-1901917: 3GPP TSG RAN WG1 Meeting #96, Athens, Greece, Feb. 25-Mar. 1, 2019, Nokia, Nokia Shanghai Bell "On intra-EU DL/UL prioritization for NR URLLC," (11 Pages).

* cited by examiner

METHOD, USER EQUIPMENT, DEVICE, AND STORAGE MEDIUM FOR PERFORMING UPLINK TRANSMISSION, AND METHOD AND BASE STATION FOR PERFORMING UPLINK RECEPTION

This application is the National Phase of PCT International Application No. PCT/KR2020/004245, filed on Mar. 27, 2020, which claims priority under 35 U.S.C. 119(e) to Korean Application Nos. 102019-0035954, filed on Mar. 28, 2019; 10-2019-0052015, filed on May 3, 2019; U.S. Provisional Application No. 62/847,848, filed on May 14, 2019; Korean Application Nos. 10-2019-0086250, filed on Jul. 17, 2019 and 10-2019-0141238, filed on Nov. 6, 2019, which are hereby incorporated by reference herein in their entirety.

TECHNICAL FIELD

The present disclosure relates to a wireless communication system.

BACKGROUND ART

Various technologies and devices such as machine-to-machine (M2M) communication, machine type communication (MTC), and smartphones and tablet personal computers (PCs) that require high data transfer rates have emerged and been disseminated. Thus, the amount of data required to be processed in a cellular network has rapidly increased. To satisfy a sudden increase in data processing requirements, a carrier aggregation (CA) technology for efficiently using more bands, a cognitive radio technology, a multi-antenna technology for increasing data transfer capacity within a limited frequency, and a multi-base station cooperation technology, and so on have been researched.

As more and more communication devices demand larger communication capacities, the need for enhanced mobile broadband (eMBB) communication relative to the legacy radio access technologies (RATs) has emerged. Massive machine type communication (mMTC) that provides various services by interconnecting multiple devices and things irrespective of time and place is also one of main issues to be addressed for future-generation communications.

A communication system design considering services/user equipments (UEs) sensitive to reliability and latency is under discussion as well. As such, the introduction of a future-generation RAT considering enhanced mobile broadband (eMBB), mMTC, ultra-reliable and low latency communication, URLLC), etc.

DISCLOSURE

Technical Problem

With the introduction of a new wireless communication technology, the number of user equipments (UEs) to which a base station needs to provide services in a predetermined resource region has increased, and the amount of data and control information that the base station transmits/receives to/from the UEs served by the BS has increased as well. Since the amount of radio resources available for the base station to communicate with the UE(s) is finite, a new method for the base station to efficiently transmit/receive uplink/downlink data and/or uplink/downlink control information to/from the UE(s) on the finite radio resources is needed. In other words, as the node density and/or the UE density increases, a method for efficiently communicating with high density nodes or high density UEs is required.

In addition, there is a need for a method to efficiently support various services with different requirements in a wireless communication system.

Further, overcoming delay or latency is a significant challenge for applications where the performance is sensitive to the delay/latency The technical objects that can be achieved through the present disclosure are not limited to what has been particularly described hereinabove and other technical objects not described herein will be more clearly understood by persons skilled in the art from the following detailed description.

Technical Solution

Various examples of the present disclosure may provide a method of transmitting and receiving a signal in a wireless communication system and apparatus for supporting the same.

In one aspect of the present disclosure, provided herein is method for transmitting an uplink signal by a user equipment in a wireless communication system, the method including receiving information about a plurality of PUCCH resource sets, and based on overlapping of a first PUCCH resource related to a first uplink signal and a second PUCCH resource related to a second uplink signal in a time domain, multiplexing the first uplink signal and the second uplink signal on a PUCCH resource included in one PUCCH resource set among the plurality of PUCCH resource sets, wherein the plurality of PUCCH resource sets may be configured to have a priority, wherein the one PUCCH resource set may be a PUCCH resource set having the highest priority among the plurality of PUCCH resource sets.

In another aspect of the present disclosure, provided herein is an apparatus for a user equipment in a wireless communication system, including at least one processor, and at least one memory operatively coupled to the at least one processor to store at least one instruction causing the at least one processor to perform operations, the operations including receiving information about a plurality of PUCCH resource sets, and based on overlapping of a first PUCCH resource related to a first uplink signal and a second PUCCH resource related to a second uplink signal in a time domain, multiplexing the first uplink signal and the second uplink signal on a PUCCH resource included in one PUCCH resource set among the plurality of PUCCH resource sets, wherein the plurality of PUCCH resource sets may be configured to have a priority, wherein the one PUCCH resource set may be a PUCCH resource set having the highest priority among the plurality of PUCCH resource sets.

In another aspect of the present disclosure, provided herein is a user equipment for transmitting a signal in a wireless communication system, the user equipment including at least one transceiver, at least one processor, and at least one memory operatively coupled to the at least one processor to store at least one instruction causing the at least one processor to perform operations, the operations including receiving information about a plurality of PUCCH resource sets, and based on overlapping of a first PUCCH resource related to a first uplink signal and a second PUCCH resource related to a second uplink signal in a time domain, multiplexing the first uplink signal and the second uplink signal on a PUCCH resource included in one PUCCH resource set among the plurality of PUCCH resource sets, wherein the plurality of PUCCH resource sets may be configured to have a priority, wherein the one PUCCH resource set may be a PUCCH resource set having the highest priority among the plurality of PUCCH resource sets.

In another aspect of the present disclosure, provided herein is a computer-readable storage medium configured to store at least one computer program including at least one instruction causing, when executed by at least one processor, the at least one processor to perform operations for a user equipment, the operations including receiving information about a plurality of PUCCH resource sets, and based on overlapping of a first PUCCH resource related to a first uplink signal and a second PUCCH resource related to a second uplink signal in a time domain, multiplexing the first uplink signal and the second uplink signal on a PUCCH resource included in one PUCCH resource set among the plurality of PUCCH resource sets, wherein the plurality of PUCCH resource sets may be configured to have a priority, wherein the one PUCCH resource set may be a PUCCH resource set having the highest priority among the plurality of PUCCH resource sets.

In another aspect of the present disclosure, provided herein is a method for receiving a signal by a base station in a wireless communication system, the method including transmitting information about a plurality of PUCCH resource sets, and based on overlapping of a first PUCCH resource related to a first uplink signal and a second PUCCH resource related to a second uplink signal in a time domain, receiving an uplink signal through a PUCCH resource included in one PUCCH resource set among the plurality of PUCCH resource sets, the uplink signal being formed by multiplexing the first uplink signal and the second uplink signal, wherein the plurality of PUCCH resource sets may be configured to have a priority, wherein the one PUCCH resource set may be a PUCCH resource set having the highest priority among the plurality of PUCCH resource sets.

In another aspect of the present disclosure, provided herein is a base station for receiving a signal in a wireless communication system, the base station including at least one processor, and at least one memory operatively coupled to the at least one processor to store at least one instruction causing the at least one processor to perform operations, the operations including transmitting information about a plurality of PUCCH resource sets, and based on overlapping of a first PUCCH resource related to a first uplink signal and a second PUCCH resource related to a second uplink signal in a time domain, receiving an uplink signal through a PUCCH resource included in one PUCCH resource set among the plurality of PUCCH resource sets, the uplink signal being formed by multiplexing the first uplink signal and the second uplink signal, wherein the plurality of PUCCH resource sets may be configured to have a priority, wherein the one PUCCH resource set may be a PUCCH resource set having the highest priority among the plurality of PUCCH resource sets.

The one PUCCH resource set may be a PUCCH resource set related to a payload size of an uplink signal formed by multiplexing the first uplink signal and the second uplink signal among the plurality of PUCCH resource sets.

Each of the plurality of PUCCH resource sets may be related to a range of a payload size of the uplink signal, wherein the range of the payload size of the uplink signal may be configured based on the priority.

The range of the payload size may be configured to include a smaller payload size as the priority becomes higher.

Receiving a downlink signal containing resource indicator information may be further included. The PUCCH resource may be indicated based on the resource indicator information among a plurality of PUCCH resources included in the one PUCCH resource set.

The plurality of PUCCH resource sets may be configured to have a maximum code rate, wherein the maximum code rate may be set to have a smaller value as the priority becomes higher.

At least one of the PUCCH resource, the plurality of PUCCH resource sets, a timing indicator set between the PUCCH resource and a PDSCH resource related to the PUCCH resource, a power control parameter related to the PUCCH resource, and a maximum payload size related to the PUCCH resource may be configured differently for each combination of the first uplink signal and the second uplink signal.

The above-described aspects of the present disclosure are merely some of the preferred embodiments of the present disclosure, and various embodiments reflecting the technical features of the present disclosure may be derived and understood by those skilled in the art based on the following detailed description of the disclosure.

Advantageous Effects

According to various examples of the present disclosure, a radio communication signal may be efficiently transmitted/received. Accordingly, the overall throughput of the wireless communication system may be improved.

In addition, various services with different requirements may be efficiently supported in a wireless communication system.

Further, delay/latency occurring in wireless communication between communication devices may be reduced.

It will be appreciated by persons skilled in the art that the effects that can be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

[Best Model]

Figure 1:
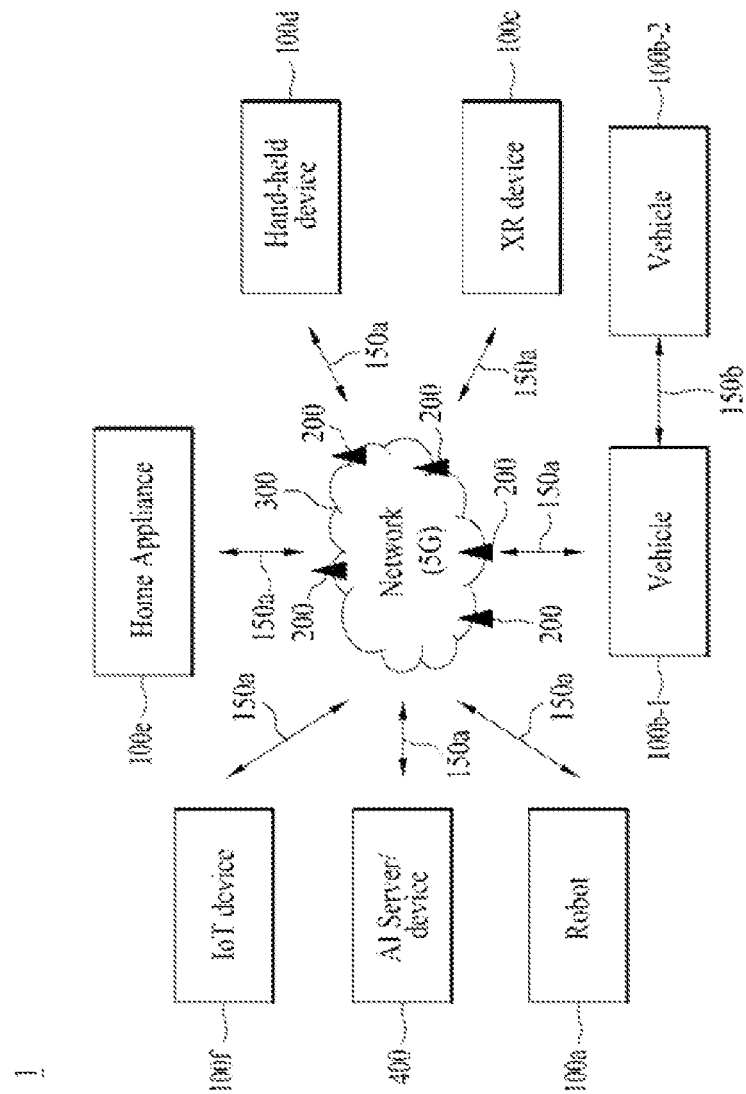
FIG. 1 illustrates a communication system 1 applied to the present disclosure.

Hereinafter, implementations according to the present disclosure will be described in detail with reference to the accompanying drawings. The detailed description set forth below in conjunction with the appended drawings is intended to describe exemplary implementations of the present disclosure and is not intended to represent only implementations for practicing the present disclosure. The following detailed description includes specific details to provide a thorough understanding of the present disclosure. However, one of ordinary skill in the art will recognize that the present disclosure may be practiced without these specific details.

In some cases, well-known structures and devices may be omitted to avoid obscuring the concepts of the present disclosure, or core functions of each structure and device may be shown in in the form of a block diagram. In addition, the same reference numerals are used to describe the same components throughout the present disclosure.

The techniques, devices, and systems described below may be applied to various wireless multiple access systems. Examples of multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system, etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

For convenience of description, it is assumed that the present disclosure is applied to a 3GPP-based communication system, for example, LTE and NR. However, the technical features of the present disclosure are not limited thereto. For example, although the following detailed description is based on a mobile communication system corresponding to the 3GPP LTE/NR system, it is also applicable to any other mobile communication system except for specific details of 3GPP LTE/NR.

Terms and Technologies not specifically described among terms and Technologies used in the present disclosure may refer to 3GPP LTE standard documents, for example, 3GPP TS 36.211, 3GPP TS 36.212, 3GPP TS 36.213, 3GPP TS 36.321, 3GPP TS 36.300, and 3GPP TS 36.331, etc. and 3GPP NR standard documents, for example, 3GPP TS 38.211, 3GPP TS 38.212, 3GPP TS 38.213, 3GPP TS 38.214, 3GPP TS 38.300, 3GPP TS 38.321, 3GPP TS 38.331, etc.

In the examples of the present disclosure described below, the expression that a device "assumes" may mean that a subject to transmit a channel transmits the channel in accordance with the corresponding "assumption". This may also mean that a subject to receive the channel receives or decodes the channel in accordance with the "assumption" on the premise that the channel is transmitted according to the "assumption".

In the present disclosure, the UE may be fixed or mobile, and various devices that communicate with a base station (BS) to transmit and/or receive user data and/or various control information belong to this. UE may be referred by Terminal Equipment, MS (Mobile Station), MT (Mobile Terminal), UT (User Terminal), SS (Subscribe Station), wireless device, PDA (Personal Digital Assistant), wireless modem, handheld device, and the like. In addition, in the present disclosure, a BS generally refers to a fixed station that communicates with a UE and/or other BSs, and communicates with the UE and other BSs to exchange various data and control information. BS may be referred to by other terms such as Advanced Base Station (ABS), Node-B (NB), evolved-NodeB (eNB), Base Transceiver System (BTS), Access Point, and Processing Server (PS). In particular, the base station of UTRAN is called Node-B, the base station of E-UTRAN is called eNB, and the base station of new radio access technology network is called gNB. Hereinafter, for convenience of description, a base station is collectively referred to as a BS regardless of a type or version of a communication technology.

In the present disclosure, a node refers to a fixed point capable of transmitting/receiving a radio signal by communicating with the UE. Various types of BSs can be used as nodes regardless of their names. For example, BS, NB, eNB, pico-cell eNB (PeNB), home eNB (HeNB), relay, repeater, etc. may be a node. Also, the node may not need to be a BS. For example, it may be a radio remote head (RRH) or a radio remote unit (RRU). RRH, RRU, and the like generally have a lower power level than that of the BS. The RRH or RRU (hereinafter, RRH/RRU) is generally connected to the BS through a dedicated line such as an optical cable. Therefore, as compared to general cooperative communication by BSs connected by radio lines, cooperative communication by RRH/RRU and BS can be smoothly performed. At least one antenna is installed in one node. The antenna may mean a physical antenna, an antenna port, a virtual antenna, or an antenna group. A node is also called a point.

In the present disclosure, a cell refers to a prescribed geographical area where one or more nodes provide communication services. Accordingly, communication with a specific cell may mean communication with a BS or node that provides communication services to the specific cell. In addition, a DL/UL signal of a specific cell refers to a DL/UL signal from/to a BS or node that provides communication services to the specific cell. A cell that provides UL/DL communication services to a UE is especially called a serving cell. The channel state/quality of a specific cell refers to the channel state/quality of a channel or communication link formed between a UE and a BS or node that provides communication service to the specific cell. In 3GPP based communication systems, a UE may measure the state of a DL channel from a specific node based on cell-specific reference signal(s) (CRS(s)) transmitted on CRS resource(s) and/or channel state information reference signal(s) (CSI-RS(s)) transmitted on CSI-RS resource(s), which are allocated to antenna port(s) of the specific node.

The 3GPP based communication systems employ the concept of a cell to manage radio resources. A cell related to radio resources is different from a cell corresponding to a geographic region.

A "cell" corresponding to a geographic region may be interpreted as coverage where a node is capable of providing services using carriers, and a "cell" related to radio resources may be interpreted as a bandwidth (BW), which is a frequency range configured by the carriers. Since each of DL coverage, a range in which a node is capable of transmitting a valid signal, and UL coverage, a range in which the node is capable of receiving a valid signal from a UE, depends on a carrier carrying each signal, the coverage of the node may be related to the coverage of the "cell" related to radio resources used by the node. Thus, the term "cell" may be used to indicate the service coverage of a node, radio resources, or a range within which a signal using a radio resource may reach with effective strength.

3GPP communication standards use the concept of a cell to manage radio resources. A "cell" related to radio resources is defined by a combination of DL resources and UL resources, that is, a combination of DL component carrier(s) (CC(s)) and UL CC(s). The cell may be configured as DL resources only or a combination of DL resources and UL resources. If carrier aggregation (CA) is supported, linkage between the carrier frequency of DL resources (or DL CCs) and the carrier frequency of UL resources (or UL CCs) may be indicated by system information. For example, the combination of DL resources and UL resources may be indicated by system information block type 2 (SIB2) linkage. The carrier frequency may be the same as or different from the center frequency of each cell or CC. If CA is configured, the UE may have one radio resource control (RRC) connection with the network. One serving cell may provide non-access stratum (NAS) mobility information during RRC connection establishment/re-establishment/handover, and one serving cell may provide a security input during RRC connection re-establishment/handover. Such a cell is called a primary cell (Pcell). The Pcell is a cell operating on a primary frequency in which the UE performs an initial connection establishment procedure or initiates a connection re-establishment procedure. Depending on UE capability, secondary cells (Scells) may be configured to form a set of serving cells together with the Pcell. The Scell is a cell that may be configured after RRC connection establishment is completed, and the Scell provides additional radio resources in addition to resources of a special cell (SpCell). A carrier corresponding to the Pcell in DL is referred to as a DL primary CC (DL PCC), and a carrier corresponding to the Pcell in UL is referred to as a UL primary CC (UL PCC). A carrier corresponding to the Scell in DL is referred to as a DL secondary CC (DL SCC), and a carrier corresponding to the Scell in UL is referred to as a UL secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of serving cells related to a master node (e.g., BS) and consists of the SpCell (Pcell) and optionally one or more Scells. When the UE is configured with the DC, the SCG is a subset of serving cells related to a secondary node and consists of the PSCell and zero or more Scells. When the UE in the RRC_CONNECTED state is configured with no CA or DC, there is only one serving cell consisting of only the PCell. When the UE in the RRC_CONNECTED state is configured with CA or DC, the term serving cells refers to a set of cells including SpCell(s) and all Scell(s). In the DC, the UE may be configured with two medium access control (MAC) entities: one MAC entity for the MCG and one MAC entity for the SCG.

When the UE is configured with only CA with no DC, a Pcell PUCCH group consisting of the Pcell and zero or more Scells and a Scell PUCCH group consisting of only Scell(s) may be configured. In the case of the Scell, a Scell in which a PUCCH related to the cell is transmitted may be configured (hereinafter referred to as a PUCCH cell). A Scell in which a PUCCH Scell is indicated belongs to the Scell PUCCH group, and a UCI-related-PUCCH is transmitted on the PUCCH Scell. A Scell in which no PUCCH Scell is indicated or a cell for PUCCH transmission is the Pcell belongs to the Pcell PUCCH group, and the UCI-related-PUCCH is transmitted on the Pcell.

In wireless communication systems, the UE receives information on DL from the BS, and the UE transmits information on UL to the BS. Information transmitted and/or received by the BS and UE may include data and various control information, and various physical channels may be used according to the type/use of information transmitted therebetween.

The 3GPP based communication standards define DL physical channels corresponding to resource elements that carry information originating from higher layers and DL physical signals corresponding to resource elements that are used by physical layers and carry no information originating from higher layers. Link physical signals are defined. For example, a physical downlink shared channel (PDSCH), a physical broadcast channel (PBCH), a physical downlink control channel (PDCCH), and so on are defined as DL physical channels, and a reference signal and a synchronization signal are defined as DL physical signals. A reference signal (RS), which is referred to as a pilot, means a signal with a predefined special waveform known to both the BS and the UE. For example, a demodulation reference signal (DMRS), a CSI-RS, and the like are defined as DL reference signals. The 3GPP based communication standards define UL physical channels corresponding to resource elements that carry information originating from higher layers and UL physical signals corresponding to resource elements that are used by physical layers and carry no information originating from higher layers. For example, a physical uplink shared channel (PUSCH), a physical uplink control channel (PUCCH), and a physical random access channel (PRACH) are defined as UL physical channels, and a DMRS for a UL control/data signal, a sounding reference signal (SRS) used for UL channel measurement, and the like are defined.

In the present disclosure, the PDCCH means a set of time-frequency resources (e.g., resource elements) carrying downlink control information (DCI), and the PDSCH means a set of time-frequency resources carrying DL data. In addition, the PUCCH, PUSCH, and PRACH mean a set of time-frequency resources carrying uplink control information (UCI), UL data, and a random access signal, respectively. Hereinafter, the expression that the UE transmits/receives the PUCCH/PUSCH/PRACH is used in the same meaning as transmitting/receiving the UCI/UL data/random access signal on or over the PUSCH/PUCCH/PRACH, respectively. In addition, the expression that the BS transmits/receives the PBCH/PDCCH/PDSCH is used in the same meaning as transmitting broadcast information/DL data/DCI on or over the PBCH/PDCCH/PDSCH, respectively.

As more and more communication devices require high communication capacity, the need for enhanced mobile broadband (eMBB) enhanced over the legacy radio access technology (RAT) is emerging. In addition, massive MTC (mMTC) capable of providing various services anytime and anywhere by connecting multiple devices and things is one of the major issues to be considered in next-generation communication. A communication system design in consideration of services/UEs sensitive to reliability and latency is being discussed. That is, the introduction of a next-generation RAT in consideration of eMBB, mMTC, and ultra-reliable and low latency communication (URLLC) is being discussed. Currently, 3GPP is conducting a study on a next-generation mobile communication system beyond EPC. In the present disclosure, the corresponding technology is referred to as a new RAT (NR) or 5G RAT, and a system using or supporting NR is referred to as a NR system.

FIG. 1 illustrates a communication system 1 applied to various embodiments of the present disclosure. Referring to FIG. 1, a communication system 1 applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication. Through the wireless communication/connection 150a and 150b, the wireless device and the BS/wireless device may transmit/receive wireless signals to each other. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Figure 2:
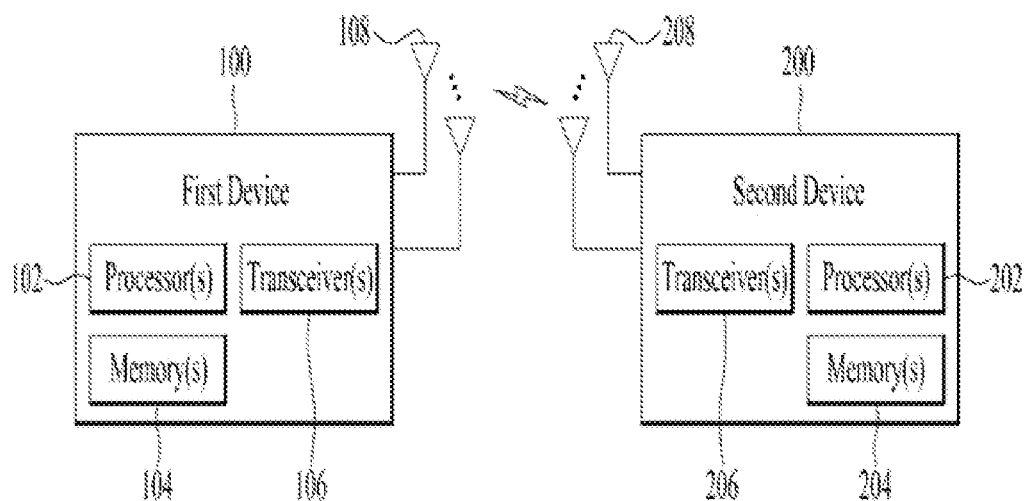
FIG. 2 illustrates example of communication devices performing a method according to the present disclosure.

FIG. 2 is a block diagram illustrating examples of communication devices capable of performing a method according to the present disclosure. Referring to FIG. 2, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
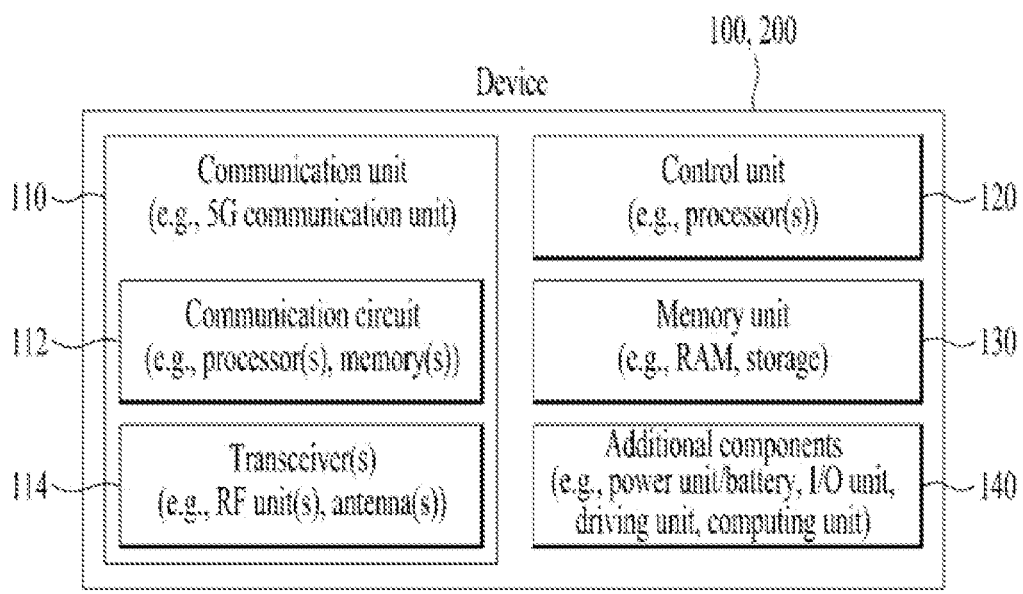
FIG. 3 illustrates another example of a wireless device applied to the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

In the present disclosure, at least one memory (e.g., memory 104 or 204) may be configured store instructions or programs. The instructions or programs, when executed, may cause at least one processor operably connected to the at least one memory to perform operations according to examples or implementations of the present disclosure.

In the present disclosure, a computer-readable storage medium may be configured to store at least one instruction or computer program. The at least one instruction or computer program, when executed by at least one processor, may cause the at least one processor to perform operations according to examples or implementations of the present disclosure.

In the present disclosure, a processing device or apparatus may include at least one processor and at least one computer memory connectable to the at least one processor. The at least one computer memory may be configured to store instructions or programs. The instructions or programs, when executed, may cause the at least one processor operably connected to the at least one memory to perform operations according to examples or implementations of the present disclosure.

A communication device of the present disclosure includes at least one processor; and at least one computer memory operably connectable to the at least one processor and configured to store instructions causing, when executed, the at least one processor to perform operations according to example(s) of the present disclosure described below.

Figure 4:
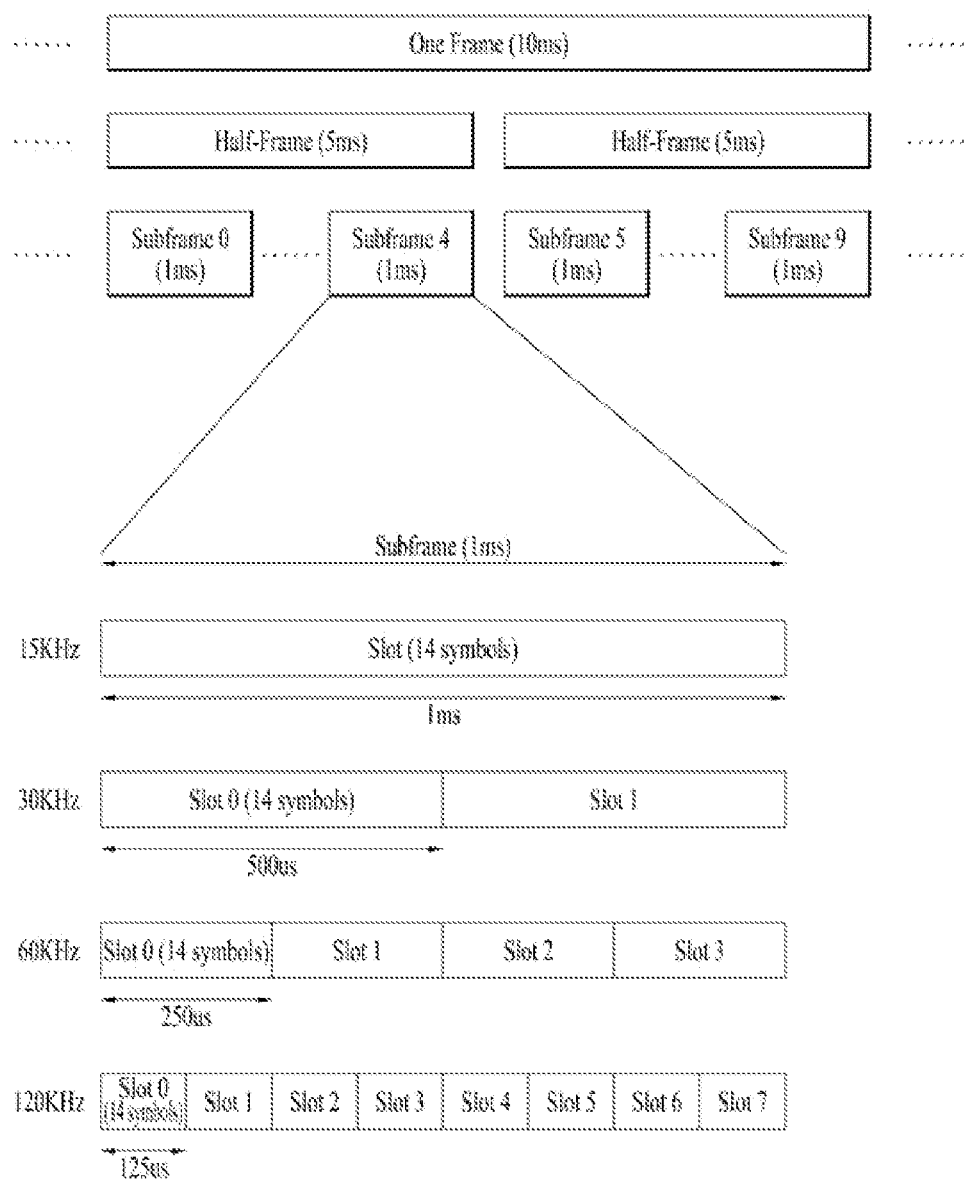
FIG. 4 illustrates an exemplary frame structure available in the 3GPP based wireless communication system.

FIG. 4 illustrates an exemplary frame structure available in the 3GPP based wireless communication system.

The structure of the frame of FIG. 4 is merely exemplary, and the number of subframes, the number of slots, and the number of symbols in the frame may be variously changed. In the NR system, the OFDM numerology (e.g., subcarrier spacing (SCS)) may be set different for a plurality of cells aggregated for one UE. Thus, the (absolute time) duration of a time resource (e.g., subframe, slot, or transmission time interval (TTI)) composed of the same number of symbols may be set different for the aggregated cells. Here, the symbol may include an OFDM symbol (or a cyclic prefix-orthogonal frequency division multiplexing (CP-OFDM) symbol) or an SC-FDMA symbol (or a discrete Fourier transform-spreading-OFDM (DFT-s-OFDM) symbol). In the present disclosure, a symbol, an OFDM-based symbol, an OFDM symbol, a CP-OFDM symbol, and a DFT-s-OFDM symbol may be substituted for each other.

Referring to FIG. 4, UL and DL transmission in the NR system are organized by frames. Each frame has a duration Tf of 10 ms and is divided into two half-frames each having a duration of 5 ms. Each half-frame consists of 5 subframes, and one subframe has a duration Tsf of 1 ms. The subframe is further divided into slots, and the number of slots in a subframe depends on the SCS. Each slot includes 14 or 12 OFDM symbols depending on cyclic prefixes. In a normal cyclic prefix (CP), each slot includes 14 OFDM symbols, and in an extended CP, each slot includes 12 OFDM symbols. The numerology depends on the SCS $\Delta f=2u*15$ kHz, which is exponentially scalable. The following table shows the number of OFDM symbols per slot (Nslotsymb), the number of slots per frame (Nframe,uslot) and the number of slots per subframe (Nsubframe,uslot) according to the SCS $\Delta f=2u*15$ kHz for the normal CP.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per subframe according to the SCS $\Delta f=2u*15$ kHz for the extended CP.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

Figure 5:
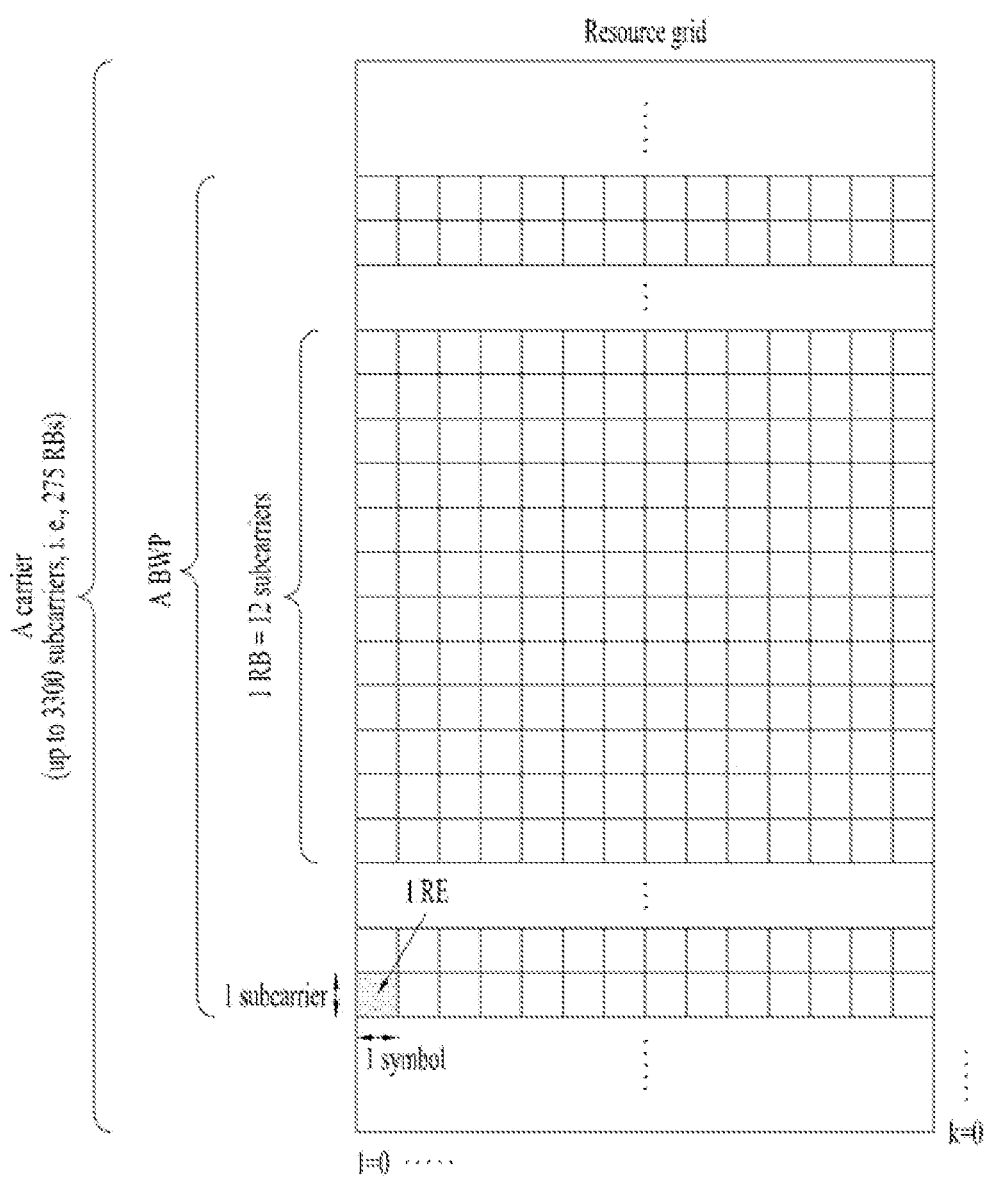
FIG. 5 illustrates a resource grid of slots.

FIG. 5 illustrates a resource grid of slots. A slot includes a plurality of (e.g., 14 or 12) symbols in the time domain. For each numerology (e.g., SCS) and carrier, a resource grid of Nsize,ugrid,x*NRBsc subcarriers and Nsubframe,usymb OFDM symbols is defined, starting at a common resource block (CRB) Nstart,ugrid indicated by higher layer signaling (e.g. RRC signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is typically 12. One resource grid may be present for given antenna port p, SCS configuration u, and transmission direction (DL or UL). The carrier bandwidth Nsize,ugrid for the SCS configuration u is provided by the network to the UE by a higher layer parameter (e.g. RRC parameter). Each element in the resource grid for the antenna port p and SCS configuration u is referred to as a resource element (RE), and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs may be classified into CRBs and physical resource blocks (PRBs). CRBs are numbered from 0 upwards in the frequency domain for the SCS configuration u. The center of subcarrier 0 of CRB 0 for the SCS configuration u coincides with 'point A' which serves as a common reference point for RB grids. PRBs are defined within a bandwidth part (BWP) and numbered from 0 to NsizeBWP,i-1, where i is the number of the bandwidth part. The relationship between a physical resource block nPRB in a bandwidth part i and a common resource block nCRB is defined as follows: nPRB=nCRB+NsizeBWP,i, where NsizeBWP,i is a CRB where the bandwidth part starts relative to CRB 0. The BWP includes a plurality of consecutive RBs. A carrier may include a maximum of N (e.g., 5) BWPs. The UE may be configured with one or more BWPs on a given component carrier. Among BWPs configured for the UE, only a predetermined number (e.g., one) of BWPs may be activated on the corresponding carrier. In addition, data communication may be performed in the activated BWP.

Figure 6:
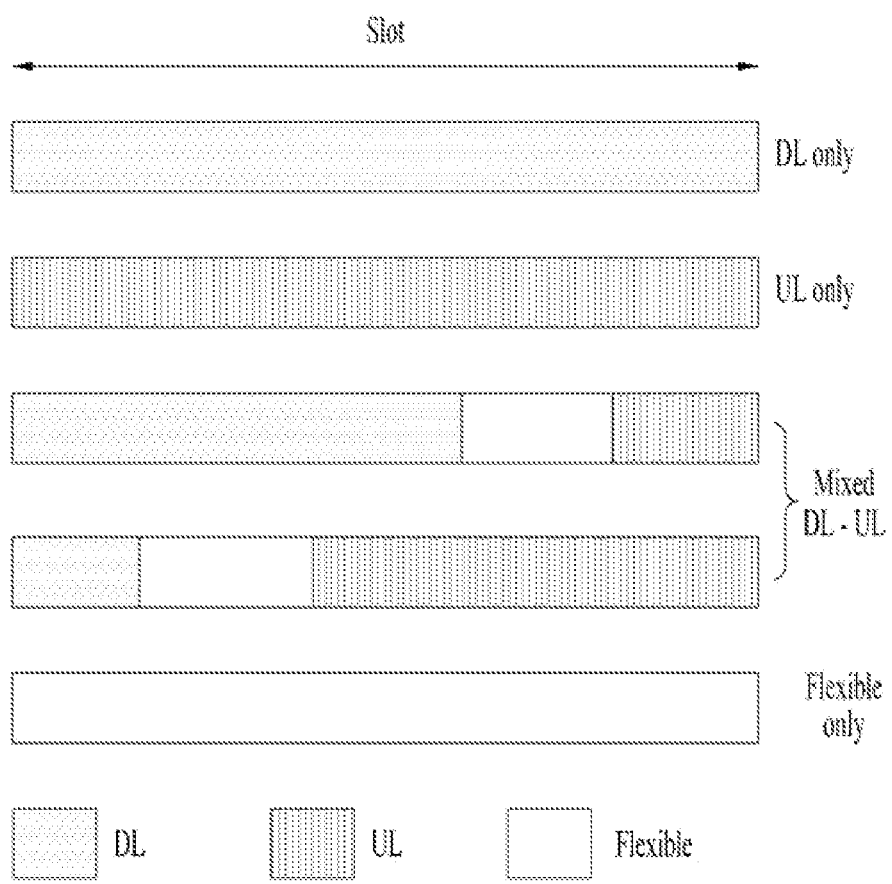
FIG. 6 illustrates slot structures available in the 3GPP based system.

FIG. 6 illustrates slot structures available in the 3GPP based system. In all 3GPP based systems, for example, in the NR systems, each slot has a self-contained structure including i) a DL control channel, ii) DL or UL data, and/or iii) a UL control channel. For example, first N symbols in a slot may be used to transmit a DL control channel (hereinafter, DL control region), and last M symbols in the slot may be used to transmit a UL control channel (hereinafter, UL control region). Each of N and M is a non-negative integer. A resource region (hereinafter, data region) between the DL control region and the UL control region may be used for DL data transmission or UL data transmission. Symbols in a single slot may be divided into DL symbols, UL symbols, and group(s) of consecutive symbols that may be used flexibly. Hereinafter, information indicating how each of the symbols of the slot is used is referred to as a slot format. For example, the slot format may define which symbols in the slot are used for UL and which symbols are used for DL.

When the serving cell operates in TDD mode, the BS may configure a pattern for UL and DL allocation for the serving cell through higher layer (e.g., RRC) signaling. For example, the following parameters may be used to configure the TDD DL-UL pattern:
dl-UL-TransmissionPeriodicity that provides the period of the DL-UL pattern;
nrofDownlinkSlots that provides the number of consecutive full DL slots at the beginning of each DL-UL pattern, where the full slot has only DL symbols;
nrofDownlinkSymbols that provides the number of consecutive DL symbols at the beginning of the slot immediately following the last full DL slot;

nrofUplinkSlots that provides the number of consecutive full UL slots at the end of each DL-UL pattern, where the full UL slot has only UL symbols; and nrofUplinkSymbols that provides the number of consecutive UL symbols at the end of the slot immediately preceding the first full UL slot.

Among the symbols in the DL-UL pattern, the remaining symbols that are not set as either DL symbols or UL symbols are flexible symbols.

Upon receiving a configuration related to the TDD DL-UL pattern, that is, the TDD UL-DL configuration (e.g., tdd-UL-DL-ConfigurationCommon or tdd-UL-DLConfigurationDedicated) through higher layer signaling, the UE sets a slot format for each slot based on the configuration.

On the other hand, various combinations of DL symbols, UL symbols, and flexible symbols are possible for each symbol. However, a predetermined number of combinations may be predefined as slot formats, and the predefined slot formats may be identified by slot format indices. Table 4 shows some of the predefined slot formats. In Table 4, D denotes a DL symbol, U denotes a UL symbol, and F denotes a flexible symbol.

TABLE 3

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | ... | | | | | | | | |

To inform which one of the predefined slot formats is used for a specific slot, the BS may configure a set of slot format combinations applicable to a serving cell for each cell through higher layer (e.g., RRC) signaling for a set of serving cells and instruct the UE to monitor a group-common PDCCH for slot format indicator (SFI)(s) through higher layer (e.g., RRC) signaling. Hereinafter, DCI carried by the group-common PDCCH for SFI(s) is referred to as SFI DCI. DCI format 2_0 is used as the SFI DCI. For example, for each serving cell in the set of serving cells, the BS may provide to the UE the (start) position of a slot format combination ID (i.e., SFI-index) for the serving cell in the SFI DCI, a set of slot format combinations applicable to the corresponding serving cell, and a reference SCS configuration for each slot format in a slot format combination indicated by the SFI-index. One or more slot formats are configured for each slot format combination in the set of slot format combinations, and the slot format combination ID (i.e., SFI-index) is assigned. For example, when the BS intends to configure a slot format combination with N slot formats, the BS may indicate N slot format indices among the slot format indices of the predefined slot formats (see Table 4) for the corresponding slot format combination. The BS informs the UE of an SFI-RNTI, which is an RNTI used for the SFI, and the total length of a DCI payload scrambled with the SFI-RNTI in order to instruct the UE to monitor the group-common PDCCH for SFI(s). If the UE detects the PDCCH based on the SFI-RNTI, the UE may determine slot format(s) for the serving cell from the SFI-index for the serving cell among the SFI-indices in the DCI payload in the PDCCH.

Symbols indicated as flexible by the TDD DL-UL pattern configuration may be indicated as UL, DL or flexible by the SFI DCI. Symbols indicated as DL/UL by the TDD DL-UL pattern configuration are not overridden as UL/DL or flexible by the SFI DCI.

If no TDD DL-UL pattern is configured, the UE determines whether each slot is UL or DL and symbol allocation in each slot based on the SFI DCI and/or DCI scheduling or triggering transmission of DL or UL signals (e.g., DCI format 1_0, DCI format 1_1, DCI format 1_2, DCI format 0_0, DCI format 0_1, DCI format 0_2, and DCI format 2_3).

If the UE is configured with CA, the UE may be configured to use one or more cells. When the UE is configured to have multiple serving cells, the UE may be configured to have one or multiple cell groups. The UE may be configured to have multiple cell groups associated with different BSs. Alternatively, the UE may be configured to have a plurality of cell groups associated with a single BS. Each cell group of the UE consists of one or more serving cells, and each cell group includes a single PUCCH cell in which PUCCH resources are configured. The PUCCH cell may be a Pcell or an Scell configured as a PUCCH cell among Scells of a cell group. Each serving cell of the UE belongs to one of the cell groups of the UE and does not belong to multiple cell groups.

NR frequency bands are defined by two types of frequency ranges, FR1 and FR2, which are also called millimeter wave (mmW). The following table exemplarily shows the frequency ranges over which NR may operate.

TABLE 4

| Frequency Range designation | Corresponding frequency range | Subcarrier Spacing |
|---|---|---|
| FR1 | 410 MHz–7125 MHz | 15, 30, 60 kHz |
| FR2 | 24250 MHz–52600 MHz | 60, 120, 240 kHz |

Hereinafter, physical channels available in the 3GPP based wireless communication system will be described in more detail.

A PDCCH carries DCI. For example, the PDCCH (i.e., DCI) may carry the transmission format and resource allocation of a downlink shared channel (DL-SCH); resource allocation information about an uplink shared channel (UL-SCH); paging information about a paging channel (PCH); system information on a DL-SCH; resource allocation information about a control message from a layer located above the physical layer (hereinafter, higher layer) among protocol stacks of the UE/BS such as an RAR transmitted on a PDSCH; transmit power control command; and activation/deactivation of configured scheduling (CS). The DCI includes a CRC, and the CRC is masked/scrambled with various identifiers (e.g., RNTI) according to the owner or use purpose of the PDCCH. For example, if the PDCCH is for a specific UE, the CRC is masked with a UE ID (e.g., C-RNTI). If the PDCCH is for paging, the CRC is masked with a paging RNTI (P-RNTI). If the PDCCH is for system information (e.g., SIB), the CRC is masked with system information RNTI (SI-RNTI). If the PDCCH is for an RAR, the CRC is masked with RA-RATI.

The PDCCH is transmitted in a CORESET. One or more CORESETs may be configured for the UE. The CORESET has a time duration of 1 to 3 OFDM symbols and includes a set of PRBs. The PRBs included in the CORESET and the CORESET duration may be provided to the UE through higher layer (e.g., RRC) signaling. The UE may monitor a set of PDCCH candidates in the configured CORESET(s) according to the corresponding search space sets. Here, monitoring implies decoding (blind decoding) of each PDCCH candidate based on monitored DCI formats. A master information block (MIB) on the PBCH provides the UE with parameters (e.g., CORESET #0 configuration) for monitoring of a PDCCH for scheduling a PDSCH carrying system information block 1 (SIB1). The PBCH may indicate that there is no SIB1 associated. In this case, the UE may receive an indication of a frequency range in which it may be assumed that there is no SSB associated with SSB1, and other frequencies to search for the SSB associated with SIB1. CORESET #0, which is a CORESET for scheduling at least SIB1, may be configured through the MIB or dedicated RRC signaling.

The set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided to the UE by the BS.
  controlResourceSetId: An identifier for identifying a CORESET associated with a search space set.
  monitoringSlotPeriodicityAndOffset: A PDCCH monitoring periodicity and PDCCH monitoring offset for configuring slots for PDCCH monitoring.
  duration: The number of consecutive slots in which the search space lasts in every occasion, i.e. every period as given by monitoringSlotPeriodicityAndOffset.
  monitoringSymbolsWithinSlot: In-slot PDCCH monitoring pattern indicating the first symbol(s) of the CORESET in a slot for PDCCH monitoring.
  nrofCandidates: The number of PDCCH candidates for each CCE aggregation level.

The UE monitors PDCCH candidates only in PDCCH monitoring occasions. The UE determines the PDCCH monitoring timing based on the PDCCH monitoring periodicity, the PDCCH monitoring offset, and the in-slot PDCCH monitoring pattern. The parameter monitoringSymbolsWithinSlot indicates, for example, the first symbol(s) for PDCCH monitoring in slots configured for PDCCH monitoring (e.g., see parameters monitoringSlotPeriodicityAndOffset and duration). For example, when monitoringSymbolsWithinSlot is in 14 bits, the most significant (left) bit represents the first OFDM symbol in the slot, and the second most significant (left) bit represents the second OFDM symbol in the slot. In this way, the bits of monitoringSymbolsWithinSlot may (respectively) symbolize the 14 OFDM symbols of the slot. For example, bit(s) set to 1 among the bits in monitoringSymbolsWithinSlot identifies the first symbol(s) of CORESET in the slot.

The following table exemplarily shows search space sets and associated RNTIs, and use cases.

TABLE 5

| Search Space Set | RNTI | Use Case |
| --- | --- | --- |
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| USS set | C-RNTI, or MCS-C-RNTI, or CS-RNTI(s) | User specific PDSCH decoding |

The following table exemplarily shows the DCI formats that may be carried by the PDCCH.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a transport block (TB) based (TB)-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 0_0 and DCI format 1_0 may have a fixed size after the BWP size is initially given by RRC. For DCI format 0_1 and DCI format 11, the size of the DCI field may be changed through various RRC reconfigurations by the BS. DCI format 2_0 may be used to deliver dynamic slot format information (e.g., SFI DCI) to the UE, and DCI format 21 may be used to deliver downlink pre-emption information to the UE.

For example, each of DCI format 0_0 and DCI format 0_1 includes a frequency domain resource assignment field for scheduling of PUSCH, and each of DCI format 1_0 and DCI format 1_1 includes a frequency domain resource assignment field for scheduling of PDSCH. The number of bits in the frequency domain resource field of each of DCI format 0_0 and DCI format 0_1 is determined based on NRBUL, BWP, which is the size of an active or initial UL BWP. The number of bits in the frequency domain resource field of each of DCI format 1_0 and DCI format 1_1 is determined based on NRBDL,BWP, which is the size of an active or initial UL BWP.

Fields defined in DCI formats are mapped to information bits a0 to aA-1 as follows. The first field of the DCI format is mapped to the lowest order information bit a0, and the successive fields are mapped to higher order information bits. The most significant bit (MSB) of each field is mapped to the lowest order information bit for the field. For example, the MSB of the first field is mapped to a0. When the information bits in the DCI format is fewer than 12 bits, zeros are appended to the DCI format until the payload size becomes 12. When necessary, the size of each DCI format is adjusted according to the following DCI size alignment.

When necessary, the DCI size alignment is performed to reduce the complexity of blind decoding by the UE. For example, in some scenarios, when necessary, padding or truncation is applied to the DCI formats according to the following operations executed in the following order:

Step 0:
Determine DCI format 0_0 monitored in the CSS, where NRBUL,BWP is the size of the initial UL BWP;
Determine DCI format 1_0 monitored in the CSS, where NRBDL,BWP is given by:
the size of CORESET #0 if CORESET #0 is configured for the cell; and
the size of the initial DL BWP if CORESET #0 is not configured for that cell;
If DCI format 0_0 is monitored in the CSS and the number of information bits in DCI format 0_0 prior to padding is less than the payload size of DCI format 1_0 monitored in the CSS for scheduling of the same serving cell, the number of zero padding bits is generated for DCI format 0_0 until the payload size equals that of DCI format 1_0;
If DCI format 0_0 is monitored in the CSS and the number of information bits in DCI format 0_0 prior to truncation is greater than the payload size of DCI format 1_0 monitored in the CSS for scheduling of the same serving cell, the bitwidth of the frequency domain resource assignment field in the DCI format 00 is reduced by truncating the first few MBSs, such that the size of DCI format 0_0 equals the size of the DCI format 1_0.

Step 1:
Determine DCI format 0_0 monitored in the USS, where NRBUL,BWP is the size of the active UL BWP;
Determine DCI format 1_0 monitored in the USS, where NRBDL,BWP is the size of the active DL BWP;
If DCI format 0_0 is monitored in the USS and the number of information bits in the DCI format 0_0 prior to padding is less than the size of the DCI format 1_0 monitored in the USS for scheduling of the same serving cell, the zeros are appended to DCI format 0_0 until the payload size equals that of the DCI format 1_0;
If DCI format 1_0 is monitored in the USS and the number of information bits in DCI format 1_0 prior to padding is less than the payload size of the DCI format 0_0 monitored in the USS for scheduling of the same serving cell, zeros are appended to DCI format 1_0 until the payload size equals that of DCI format 0_0.

Step 2:
If the size of DCI format 0_1 monitored in a USS is the same as that of DCI format 0_0/1_0 monitored in another USS, zero padding of 1 bit is appended to DCI format 0_1;
If the size of DCI format 1_1 monitored in a USS is the same as that of DCI format 0_0/1_0 monitored in another USS, zero padding of 1 bit is appended to DCI format 1_1.

Step 3:
The DCI size alignment procedure is complete when both of the following conditions are fulfilled:
the total number of different DCI sizes is not greater than 4 for the cell;
the total number of different DCI sizes with C-RNTI configured to monitor is not greater than 3 for the cell.

Step 4:
Otherwise,
Remove the padding bit (if any) introduced in step 2 above;
Determine DCI format 1_0 monitored in a USS, where NRBDL,BWP is given by:
the size of CORESET #0 if CORESET #0 is configured for the cell; and
the size of the initial DL BWP if CORESET #0 is not configured for the cell;
Determine DCI format 0_0 monitored in a USS, where NRBUL,BWP is the size of the initial UL BWP;
If the number of information bits in the DCI format 0_0 monitored in a USS prior to padding is less than the payload size of the DCI format 1_0 monitored in the USS for scheduling the same serving cell, a number of zero padding bits are generated for the DCI format 0_0 monitored in the USS until the payload size equals that of DCI format 1_0 monitored in the USS;
If the number of information bits in the DCI format 0_0 monitored in the USS prior to truncation is greater than the payload size of the DCI format 1_0 monitored in the USS for scheduling the same serving cell, the bitwidth of the frequency domain resource assignment field in the DCI format 0_0 is reduced by truncating the first few MBSs such that the size of DCI format 0_0 monitored in the USS equals the size of the DCI format 1_0 monitored in the USS.

Hereinafter, for simplicity, the DCI size alignment procedure is referred to as a "first DCI size alignment procedure."

The UE is not expected to handle a configuration that, after applying the above steps, results in:
the total number of different DCI sizes configured to monitor is greater than 4 for the cell; or
the total number of different DCI sizes with C-RNTI configured to monitor is greater than 3 for the cell; or
the size of DCI format 0_0 in a USS is equal to that of DCI format 0_1 in another USS; or
the size of DCI format 10 in a USS is equal to that of DCI format 1_1 in another USS.

The UE and the BS may perform the DCI size alignment procedure. The BS may configure parameters affecting the DCI size, and the UE may determine the DCI size(s) for the UE to monitor in the cell based on the parameters. The parameters affecting the DCI size may include, for example, frequency domain resource assignment, time domain resource assignment, a PDSCH-to-HARQ feedback timing indicator, antenna port, a BWP indicator, and/or SRS resource indicators. The UE and the BS may determine whether to perform the DCI size alignment procedure for the cell based on the parameters. The BS may transmit DCI(s) in the cell based on the DCI size(s) adjusted according to the DCI size alignment procedure. The UE may perform DCI monitoring (i.e., PDCCH monitoring) in the expectation that DCI(s) with DCI size(s) adjusted according to the DCI size alignment procedure for the cell will be transmitted in the cell. In other words, the UE may perform DCI monitoring based on the DCI size(s) adjusted according to the DCI size alignment procedure for the cell.

A PDSCH is a physical layer UL channel for UL data transport. The PDSCH carries DL data (e.g., DL-SCH transport block), and modulation schemes such as Quadrature Phase Shift Keying (QPSK), 16 Quadrature Amplitude Modulation (QAM), 64 QAM, and 256 QAM are applied. A codeword is generated by encoding a transport block (TB). The PDSCH may carry up to two codewords. Scrambling and modulation mapping are performed for each codeword, and modulation symbols generated from each codeword may be mapped to one or more layers. Each layer is mapped to radio resources together with a DMRS so that an OFDM symbol signal is generated and transmitted on a corresponding antenna port.

A PUCCH means a physical layer UL channel for UCI transmission. The PUCCH carries UCI. The UCI includes:

Scheduling request (SR): an SR is information used to request a UL-SCH resource.

Hybrid automatic repeat request acknowledgment (HARQ-ACK): a HARQ-ACK is a response to a DL data packet (e.g., codeword) on a PDSCH. It indicates whether the DL data packet is successfully received by a communication device. A one-bit HARQ-ACK may be transmitted in response to a single codeword, and a two-bit HARQ-ACK may be transmitted in response to two codewords. The HARQ-ACK includes positive ACK (simply, ACK), negative ACK (NACK), DTX or NACK/DTX. Here, the term HARQ-ACK is used interchangeably with HARQ ACK/NACK, ACK/NACK, or A/N.

Channel state information (CSI): CSI is feedback information about a DL channel. The CSI may include channel quality information (CQI), a rank indicator (RI), a precoding matrix indicator (PMI), a CSI-RS resource indicator (CRI), an SS/PBCH resource block indicator (SSBRI), a layer indicator (LI), and the like. The CSI may be classified into CSI part 1 and CSI part 2 according to the type of UCI included in the CSI. For example, the CRI, RI, and/or CQI for the first codeword may be included in CSI part 1, and the LI, PMI, and CQI for the second codeword may be included in CSI part 2.

In the present disclosure, for convenience, PUCCH resources configured and/or indicated by the BS to the UE for transmission of a HARQ-ACK, an SR, and CSI are referred to as a HARQ-ACK PUCCH resource, an SR PUCCH resources, and a CSI PUCCH resources, respectively.

PUCCH formats may be classified as follows according to the UCI payload size and transmission length (e.g., the number of symbols included in a PUCCH resource). Details of the PUCCH formats may also be found in Table 5.

(0) PUCCH format 0 (PF0, F0)

Supported UCI payload size: up to K bits (e.g. K=2)

Number of OFDM symbols included in single PUCCH: 1 to X symbols (e.g., X=2)

Transmission structure: PUCCH format 0 consists of only a UCI signal with no DMRS, and the UE transmits a UCI state by selecting and transmitting one of a plurality of sequences. For example, the UE transmits specific UCI to the BS by transmitting one of the plurality of sequences on a PUCCH with PUCCH format 0. The UE transmits a PUCCH with PUCCH format 0 on a PUCCH resource for configuring a positive SR only when transmitting the corresponding SR.

The configuration for PUCCH format 0 includes the following parameters for the corresponding PUCCH resource: the index for an initial cyclic shift, the number of symbols for PUCCH transmission, and the first symbol for the PUCCH transmission.

(1) PUCCH format 1 (PF1, F1)

Supported UCI payload size: up to K bits (e.g. K=2)

Number of OFDM symbols included in single PUCCH: Y to Z symbols (e.g., Y=4 and Z=14)

Transmission structure: A DMRS and UCI are configured/mapped to different OFDM symbols by TDM. That is, the DMRS is transmitted in a symbol where modulation symbols are not transmitted. The UCI is expressed by multiplying a specific sequence (e.g., orthogonal cover code (OCC)) by a modulation (e.g., QPSK) symbol. By applying a cyclic shift (CS)/OCC to both the UCI and DMRS, code division multiplexing (CDM) is supported between multiple PUCCH resources (in the same RB) (according to PUCCH format 1). PUCCH format 1 carries UCI with a maximum size of two bits, and modulation symbols are spread by the OCC in the time domain (where the OCC is configured differently depending on whether frequency hopping is performed).

The configuration for PUCCH format 1 includes the following parameters for the corresponding PUCCH resource: the index for an initial cyclic shift, the number of symbols for PUCCH transmission, the first symbol for the PUCCH transmission, the index for the OCC.

(2) PUCCH format 2 (PF2, F2)

Supported UCI payload size: more than K bits (e.g. K=2)

Number of OFDM symbols included in single PUCCH: 1 to X symbols (e.g. X=2)

Transmission structure: A DMRS and UCI are configured/mapped to the same symbol by FDM. The UE transmits by applying only an IFFT with no DFT to coded UCI bits. PUCCH format 2 carries UCI with a bit size larger than K bits, and modulation symbols are transmitted by FDM with the DMRS. For example, the DMRS is located at symbol indices #1, #4, #7, and #10 in a given RB with a density of 1/3. A pseudo noise (PN) sequence is used as the DMRS sequence. Frequency hopping may be enabled for 2-symbol PUCCH format 2.

The configuration for PUCCH format 2 includes the following parameters for the corresponding PUCCH resource: the number of PRBs, the number of symbols for PUCCH transmission, and the first symbol for the PUCCH transmission.

(3) PUCCH format 3 (PF3, F3)

Supported UCI payload size: more than K bits (e.g. K=2)

Number of OFDM symbols included in single PUCCH: Y to Z symbols (e.g. Y=4, Z=14)

Transmission structure: A DMRS and UCI are configured/mapped to different symbols by TDM. The UE transmits by applying a DFT to coded UCI bits. PUCCH format 3 does not support UE multiplexing on the same time-frequency resource (e.g., the same PRB).

The configuration for PUCCH format 3 includes the following parameters for the corresponding PUCCH resource: the number of PRBs, the number of symbols for PUCCH transmission, and the first symbol for the PUCCH transmission.

(4) PUCCH format 4 (PF4, F4)

Supported UCI payload size: more than K bits (e.g. K=2)

Number of OFDM symbols included in single PUCCH: Y to Z symbols (e.g. Y=4, Z=14)

Transmission structure: A DMRS and UCI are configured/mapped to different symbols by TDM. PUCCH format 4 may multiplex up to four UEs in the same PRB by applying an OCC in the front end of a DFT and applying a CS (or interleaved FDM (IFDM) mapping) to the DMRS. In other words, UCI modulation symbols are transmitted by TDM with the DMRS.

The configuration for PUCCH format 4 includes the following parameters for the corresponding PUCCH resource: the number of symbols for PUCCH transmission, the length of the OCC, the index for the OCC, and the first symbol for the PUCCH transmission.

Following table shows PUCCH formats. The PUCCH formats may be divided into short PUCCH formats (format 0 and 2) and long PUCCH formats (format 1, 3, and 4) depending on the PUCCH transmission length.

TABLE 7

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

The PUCCH resource may be determined for each UCI type (e.g., A/N, SR, CSI). The PUCCH resource used for UCI transmission may be determined based on the UCI (payload) size. For example, the BS may configure a plurality of PUCCH resource sets to the UE, and the UE may select a specific PUCCH resource set with a specific range depending on the range of the UCI (payload) size (e.g., the number of UCI bits). For example, the UE may select one of the following PUCCH resource sets depending on the number of UCI bits (NUCI).

PUCCH resource set #0 if the number of UCI bits = < 2

PUCCH resource set #1 if the 2 < number of UCI bits = < N1

...

PUCCH resource set #(K-1) if NK-2 < number of UCI bits = < NK-1

K is the number of PUCCH resource sets (K>1), and Ni is the maximum number of UCI bits supported by PUCCH resource set #i. For example, PUCCH resource set #1 may be configured with resources of PUCCH formats 0 to 1, and other PUCCH resource sets may be configured with resources of PUCCH formats 2 to 4 (see Table 7).

The configuration for each PUCCH resource includes the index of a PUCCH resource, the index of a start PRB, and the configuration for one of PUCCH formats 0 to 4. The BS may configure for the UE a code rate for multiplexing HARQ-ACK, SR and CSI report(s) on PUCCH transmission using PUCCH format 2, PUCCH format 3, or PUCCH format 4 through a higher layer parameter maxCodeRate. The higher layer parameter maxCodeRate is used to determine how to feedback UCI on PUCCH resources for PUCCH format 2, 3 or 4.

When the UCI type is an SR or CSI, a PUCCH resource to be used for UCI transmission in a PUCCH resource set may be configured to the UE by the network through higher layer signaling (e.g., RRC signaling). When the UCI type is a HARQ-ACK for a semi-persistent scheduling (SPS) PDSCH, a PUCCH resource to be used for UCI transmission in a PUCCH resource set may be configured to the UE by the network through higher layer signaling (e.g., RRC signaling). On the other hand, when the UCI type is a HARQ-ACK for a PDSCH scheduled by DCI, a PUCCH resource to be used for UCI transmission in a PUCCH resource set may be scheduled by the DCI.

In the case of DCI-based PUCCH resource scheduling, the BS transmits DCI to the UE on a PDCCH. In addition, the BS may indicate a PUCCH resource to be used for UCI transmission in a specific PUCCH resource set through an ACK/NACK resource indicator (ARI) in the DCI. The ARI is used to indicate a PUCCH resource for ACK/NACK transmission, and the ARI may be referred to as a PUCCH resource indicator (PRI). Here, DCI may be used for PDSCH scheduling, and UCI may include a HARQ-ACK for a PDSCH. On the other hand, the BS may configure to the UE a PUCCH resource set consisting of more PUCCH resources than the number of states indicated by the ARI through a (UE-specific) higher layer (e.g., RRC) signal. In this case, the ARI indicates a PUCCH resource subset in the PUCCH resource set. Which PUCCH resource is used in the indicated PUCCH resource subset may be determined according to an implicit rule, which is based on transmission resource information about the PDCCH (e.g., the index of a start control channel element (CCE) of the PDCCH, etc.).

The UE needs to have UL resources available to the UE for UL-SCH data transmission and DL resources available to the UE for DL-SCH data reception. Such UL resources and DL resources are assigned to the UE through resource allocation by the BS. The resource allocation may include time domain resource assignment (TDRA) and frequency domain resource assignment (FDRA). In the present disclosure, UL resource allocation is also referred to as a UL grant, and DL resource allocation is also referred to as DL assignment. The UE may dynamically receive the UL grant on a PDCCH or in an RAR, or the UE may be semi-persistently configured with the UL grant through RRC signaling from the BS. The UE may dynamically receive the DL assignment on a PDCCH, or the UE may be semi-persistently configured with the DL assignment through RRC signaling from the BS.

In UL, the BS may dynamically allocate UL resources to the UE over PDCCH(s) addressed to a C-RNTI. The UE monitors the PDCCH(s) to discover possible UL grant(s) for UL transmission. In addition, the BS may allocate UL resources using a grant configured to the UE. Two types of configured grants: type 1 and type 2 may be used. In the case of type 1, the BS may directly provide a configured UL grant (including the periodicity) through RRC signaling. In case of type 2, the BS may configure the periodicity of an RRC configured UL grant through RRC signaling and signal and activate/deactivate the configured UL over a PDCCH addressed to a configured scheduling RNTI (CS-RNTI). For example, in the case of type 2, the PDCCH addressed to the CS-RNTI indicates that the corresponding UL grant may be implicitly reused according to the periodicity configured by the RRC signaling until the UL grant is deactivated.

In DL, the BS may dynamically allocate DL resources to the UE over PDCCH(s) addressed with a C-RNTI. The UE monitors the PDCCH(s) to discover possible DL assignments. In addition, the BS may allocate DL resources to the UE through semi-static (or semi-persistent) scheduling (SPS). The BS may configure the periodicity of the configured DL assignments through RRC signaling and signal and activate/deactivate the configured DL assignments over a PDCCH addressed to a CS-RNTI. For example, the PDCCH addressed to the CS-RNTI indicates that the corresponding DL assignments may be implicitly reused according to the periodicity configured by the RRC signaling until they are deactivated.

Hereinafter, resource allocation by a PDCCH and resource allocation by RRC will be described in detail.

* Resource allocation by PDCCH: dynamic grant/assignment

The PDCCH may be used to schedule DL transmission on a PDSCH or UL transmission on a PUSCH. DCI on the PDCCH scheduling DL transmission may include a DL resource assignment including at least a modulation and coding format (e.g., modulation and coding scheme (MCS) index (IMCS)), resource allocation, and HARQ information related to a DL-SCH. DCI on the PDCCH scheduling UL transmission may include a UL scheduling grant including at least a modulation and coding format, resource allocation, and HARQ information related to a UL-SCH. The size and usage of DCI carried by one PDCCH may vary depending on DCI formats. For example, DCI format 0_0, DCI format 0_1, or DCI format 0_2 may be used for PUSCH scheduling, and DCI format 1_0, DCI format 1_1, or DCI format 1_2 may be used for PDSCH scheduling. In particular, DCI format 0_2 and DCI format 1_2 may be used to schedule transmission with higher transmission reliability and lower latency requirements than those guaranteed by DCI format 0_0, DCI format 0_1, DCI format 1_0, and DCI format 1_1. Some implementations of the present disclosure may be applied to UL data transmission based on DCL format 0_2. Some implementations of the present disclosure may be applied to DL data reception based on DCI format 1_2.

Figure 7:
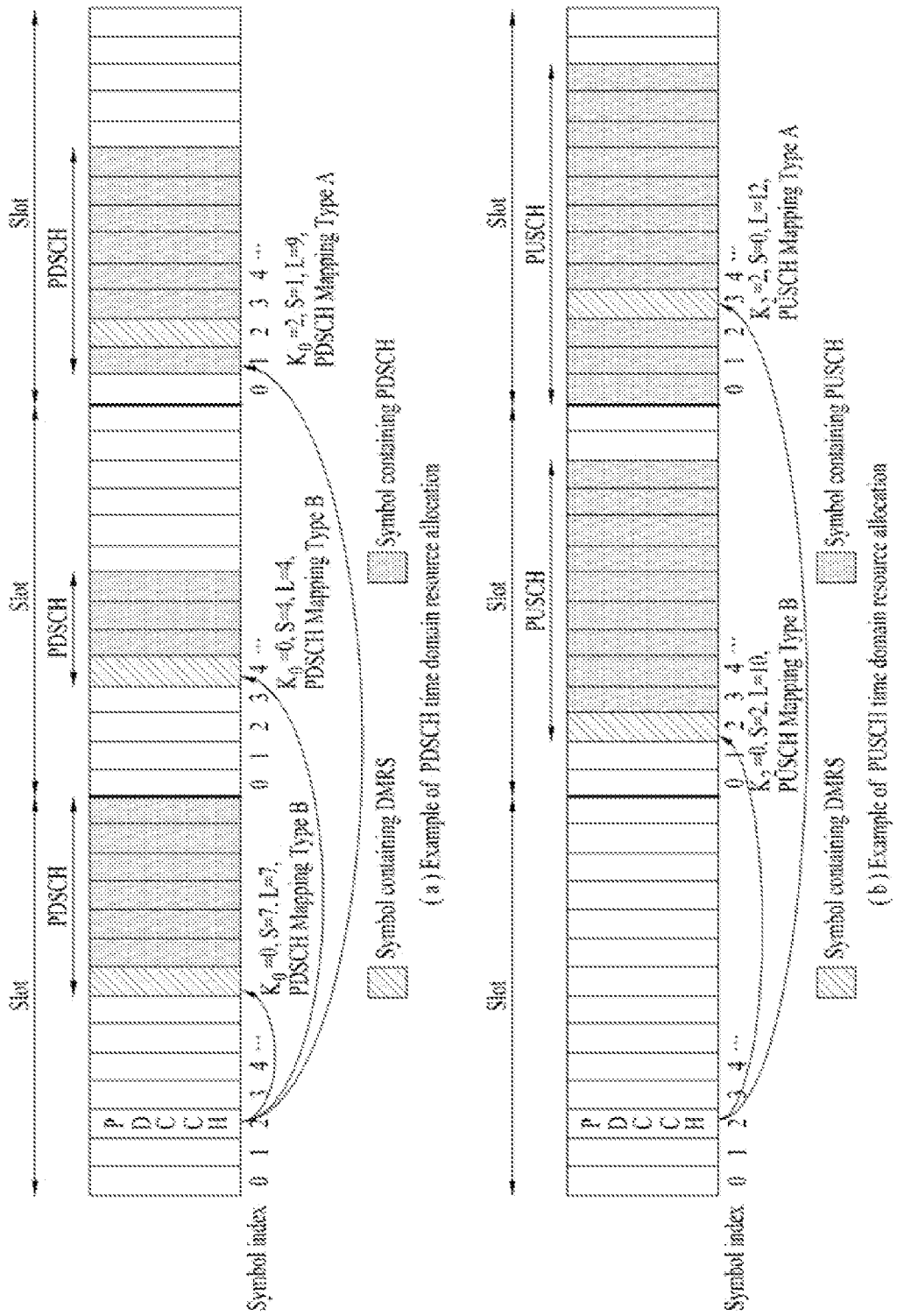
FIG. 7 illustrates an example of physical downlink shared channel (PDSCH) time domain resource assignment and physical uplink shared channel (PUSCH) time domain resource assignment by a physical downlink control channel (PDCCH).

FIG. 7 illustrates an example of PDSCH time domain resource assignment and PUSCH time domain resource assignment by a PDCCH.

DCI carried by a PDCCH to schedule a PDSCH or PUSCH includes a time domain resource assignment (TDRA) field. The TDRA field provides a value m for a row index m+1 into an allocation table for the PDSCH or PUSCH. Predefined default PDSCH time domain allocation is applied as the allocation table for the PDSCH, or a PDSCH time domain resource assignment table configured by the BS through RRC signaling pdsch-TimeDomainAllocationList is applied as the allocation table for the PDSCH. Predefined default PUSCH time domain allocation is applied as the allocation table for the PDSCH, or a PUSCH time domain resource assignment table configured by the BS through RRC signaling pusch-TimeDomainAllocationList is applied as the allocation table for the PUSCH. The PDSCH time domain resource assignment table to be applied and/or the PUSCH time domain resource assignment table to be applied may be determined according to fixed/predefined rules (see 3GPP TS 38.214).

In PDSCH time domain resource configurations, each indexed row defines a DL assignment-to-PDSCH slot offset K0, a start and length indicator (SLIV) (or the start position of the PDSCH in a slot (e.g., start symbol index S) and the allocation length thereof (e.g., the number of symbols L)), and a PDSCH mapping type. In PUSCH time domain resource configurations, each indexed row defines a UL grant-to-PUSCH slot offset K2, the start position of the PUSCH in a slot (e.g., start symbol index S) and the allocation length thereof (e.g., the number of symbols L), and a PUSCH mapping type. K0 for the PDSCH denotes the difference between a slot including the PDCCH and a slot including the PDSCH related to the PDCCH, and K2 for the PUSCH denotes the difference between the slot including the PDCCH and a slot including the PUSCH related to the PDCCH. The SLIV is a joint indication of the start symbol S relative to the start of the slot including the PDSCH or PUSCH and the number L of consecutive symbols counted from the symbol S. There are two PDSCH/PUSCH mapping types: one is mapping type A and the other is mapping type B. In the case of PDSCH/PUSCH mapping type A, a DMRS is located in the third symbol (symbol #2) or the fourth symbol (symbol #3) in a slot according to RRC signaling. In case of PDSCH/PUSCH mapping type B, a DMRS is located in the first symbol allocated for the PDSCH/PUSCH.

The scheduling DCI includes a frequency domain resource assignment (FDRA) field that provides assignment information on RBs used for the PDSCH or PUSCH. For example, the FDRA field provides to the UE information about a cell for PDSCH or PUSCCH transmission, information about a BWP for PDSCH or PUSCH transmission, and information about RBs for PDSCH or PUSCH transmission.

* Resource allocation by RRC

As described above, there are two types of transmission with no dynamic grant in UL: configured grant type 1 and configured grant type 2. In configured grant type 1, a UL grant is provided by RRC signaling and stored as the configured grant. In configured grant type 2, a UL grant is provided by a PDCCH, and the UL grant is stored as the configured UL grant or cleared depending on L1 signaling indicating activation or deactivation of the configured UL grant. Type 1 and type 2 may be configured by RRC signaling for each serving cell and for each BWP. Multiple configurations may be simultaneously activated in different serving cells.

When configured grant type 1 is configured, the UE may receive the following parameters from the BS through RRC signaling:
  cs-RNTI that provides a CS-RNTI for retransmission;
  periodicity that provides the periodicity of configured grant type 1;
  timeDomainOffset that indicates a resource offset for system frame number (SFN)=0 in the time domain;
  timeDomainAllocation value m that provides a row index m+1 pointing to an allocation table, which indicates a combination of the start symbol S, length L, and PUSCH mapping type;
  frequencyDomainAllocation that provides frequency domain resource assignment; and
  mcsAndTBS that provides an IMCS indicating a modulation order, a target code rate, and a TB size.

When configuration grant type 1 is configured for a serving cell by RRC, the UE stores a UL grant provided by RRC as the configured UL grant for the indicated serving cell and perform initialization or re-initialization so that the UL grant starts in the symbol and recurs at the periodicity according to timeDomainOffset and S (derived from SLIV). After the UL grant is configured for configured grant type 1, the UE may consider that the UL grant recurs in each symbol satisfying the following: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame*numberOfSymbolsPerSlot), for all N>=0, where, numberOfSlotsPerFrame and numberOfSymbolsPerSlot denote the number of consecutive slots per frame and the number consecutive OFDM symbols per slot, respectively (see Tables 2 and 3).

When configured grant type 2 is configured, the UE may receive the following parameters from the BS through RRC signaling:
- cs-RNTI that provides a CS-RNTI for activation, deactivation, and retransmission; and
- periodicity that provides the periodicity of the set grant type 2

The actual UL grant is provided to the UE by the PDCCH (addressed to the CS-RNTI). After the UL grant is configured for configured grant type 2, the UE may consider that the UL grant recurs in each symbol that satisfies the following:

[(SFN*numberOfSlotsPerFrame*numberOfSymbolsPerSlot)+(slot number in the frame*numberOfSymbolsPerSlot)+symbol number in the slot]=[(SFNstart time*numberOfSlotsPerFrame*numberOfSymbolsPerSlot+slotstart time*numberOfSymbolsPerSlot+symbolstart time)+N*periodicity] modulo (1024*numberOfSlotsPerFrame*numberOfSymbolsPerSlot), for all N>=0, where SFNstart time, slotstart time, and symbolstart time denote the SFN, slot, and symbol of the first transmission opportunity of the PUSCH after the configured grant is (re-)initialized, respectively, and numberOfSlotsPerFrame and numberOfSymbolsPerSlot denote the number of consecutive slots per frame and the number of consecutive OFDM symbols per slot respectively (see Tables 2 and 3).

In DL, the UE may be configured with SPS for each serving cell and for each BWP through RRC signaling from the BS. In the case of DL SPS, a DL assignment may be provided to the UE over a PDCCH and be stored or cleared based on L1 signaling indicating SPS activation or deactivation. When the SPS is configured, the UE may receive the following parameters from the BS through RRC signaling:
- cs-RNTI that provides a CS-RNTI for activation, deactivation, and retransmission;
- nrofHARQ-Processes that provides the number of configured HARQ processes for the SPS;
- periodicity that provides the periodicity of the DL assignment configured for the SPS.

After the DL assignment is configured for the SPS, the UE may consider that an N-th DL assignment sequentially occurs in a slot satisfying the following: (numberOfSlotsPerFrame*SFN+slot number in the frame)= [(numberOfSlotsPerFrame*SFNstart time+slotstart time)+N*periodicity*numberOfSlotsPerFrame/10] modulo (1024*numberOfSlotsPerFrame), where SFNstart time and slotstart time denote the SFN and slot of the first transmission opportunity of the PDSCH after the configured DL assignment is (re-)initialized, respectively, and numberOfSlotsPerFrame and numberOfSymbolsPerSlot denote the number of consecutive slots per frame and the number of consecutive OFDM symbols per slot, respectively (see Tables 2 and 3).

If the CRC of a DCI format is scrambled with a CS-RNTI provided by the RRC parameter cs-RNTI and the new data indicator field for an enabled TB is set to 0, the UE may validate a DL SPS assignment PDCCH or a configured UL grant type 2 PDCCH for scheduling activation or scheduling release. If all fields for the DCI format are set according to Table 6 or 7, validation of the DCI format is achieved. Table 6 shows special fields for DL SPS and UL grant type 2 scheduling activation PDCCH validation, and Table 7 shows special fields for DL SPS and UL grant type 2 scheduling release PDCCH validation.

TABLE 8

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 9

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

The actual DL or UL assignment for DL SPS or UL grant type 2 and the corresponding MCS may be provided by resource assignment fields (e.g., the TDRA field providing the TDRA value m, the FDRA field providing the frequency RB allocation, and the MCS field) in the DCI format carried by the corresponding DL SPS or UL grant type 2 scheduling activation PDCCH. If validation is achieved, the UE considers information in the DCI format as valid activation or valid release of the DL SPS or configured UL grant type 2.

Figure 8:
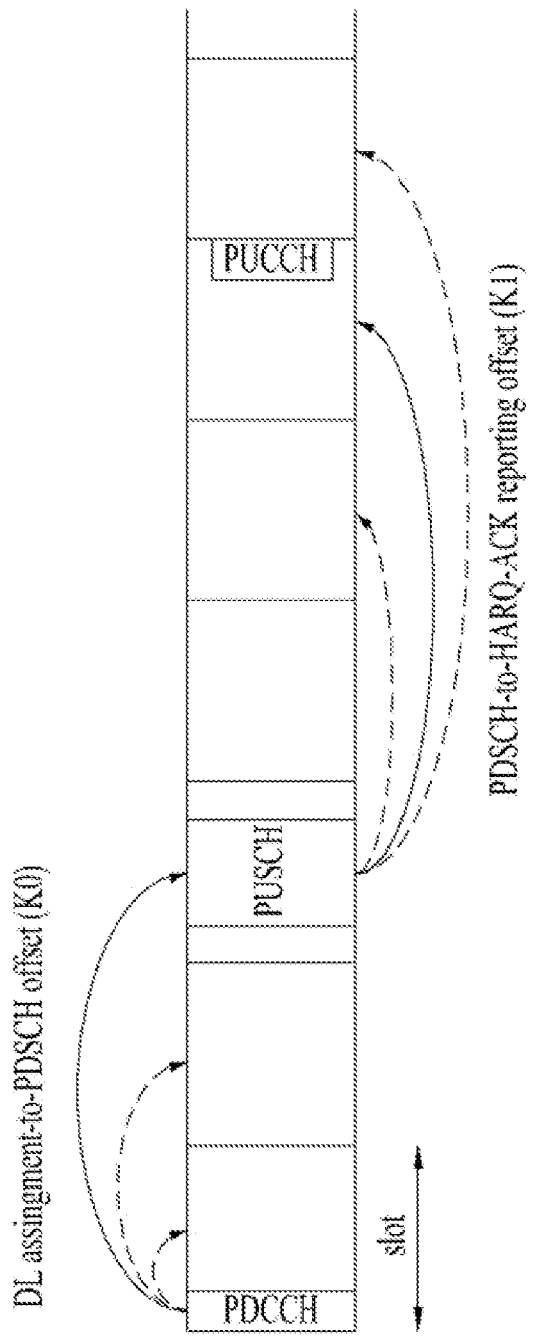
FIG. 8 illustrates a hybrid automatic repeat request acknowledgement (HARQ-ACK) transmission/reception process.

FIG. 8 illustrates a HARQ-ACK transmission/reception process.

Referring to FIG. 8, the UE may detect a PDCCH in slot n. Thereafter, the UE may receive a PDSCH in slot n+K0 according to the scheduling information received over the PDCCH in slot n and then transmit UCI over a PUCCH in slot n+K1. Here, the UCI includes a HARQ-ACK response for the PDSCH.

DCI (e.g., DCI format 1_0, DCI format 1_1) carried by the PDCCH for scheduling the PDSCH may include the following information.
- Frequency domain resource assignment (frequency domain resource assignment (FDRA): indicates a set of RBs assigned to the PDSCH.
- Time domain resource assignment (time domain resource assignment (TDRA): indicates DL assignment-to-PDSCH slot offset K0, the starting position (e.g., symbol index S) and length (e.g., the number of symbols L) of the PDSCH in the slot, and PDSCH mapping type. PDSCH mapping type A or PDSCH mapping type B may be indicated by TDRA. In the case of PDSCH mapping type A, the DMRS is positioned in the third symbol (symbol #2) or the fourth symbol (symbol #3) in the slot. In the case of PDSCH mapping type B, the DMRS is positioned in the first symbol allocated for the PDSCH.
- PDSCH-to-HARQ_feedback timing indicator: indicates K1.

When the PDSCH is configured to transmit a maximum of 1 transport block (TB), the HARQ-ACK response may be configured in 1 bit. When the PDSCH is configured to transmit up to two TBs, the HARQ-ACK response may be configured in 2 bits if spatial bundling is not configured, or may be configured in 1 bit if spatial bundling is configured. When the HARQ-ACK transmission timing for a plurality of PDSCHs is specified as slot n+K1, the UCI transmitted in slot n+K1 includes a HARQ-ACK response for the plurality of PDSCHs.

In the present disclosure, the HARQ-ACK payload composed of HARQ-ACK bit(s) for one or more PDSCHs may be referred to as a HARQ-ACK codebook. The HARQ-ACK codebook may be divided into a semi-static HARQ-ACK codebook and a dynamic HARQ-ACK codebook by a method by which the HARQ-ACK payload is determined.

In the case of the semi-static HARQ-ACK codebook, parameters related to the HARQ-ACK payload size to be reported by the UE are semi-statically configured by a (UE-specific) higher layer (e.g., RRC) signal. For example, regarding the HARQ-ACK payload size of the semi-static HARQ-ACK codebook, the (maximum) HARQ-ACK payload (size) transmitted on one PUCCH in a slot may be determined based on the number of HARQ-ACK bits corresponding to a combination (hereinafter, bundling window) of all DL carriers (i.e., DL serving cells) configured to the UE and all DL scheduling slots (or PDSCH transmission slots or PDCCH monitoring slots) in which the HARQ-ACK transmission timing may be indicated. That is, the semi-static HARQ-ACK codebook is a scheme in which the size of the HARQ-ACK codebook is fixed (to the maximum value) regardless of the number of actually scheduled DL data. For example, the DL grant DCI (PDCCH) includes PDSCH-to-HARQ-ACK timing information. The PDSCH-to-HARQ-ACK timing information may have one value (e.g., k) among a plurality of values. For example, when a PDSCH is received in slot #m, and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k may be defined as k∈{1, 2, 3, 4, 5, 6, 7, 8}. When HARQ-ACK information is transmitted in slot #n, the HARQ-ACK information may include the maximum possible HARQ-ACKs based on the bundling window. That is, HARQ-ACK information of slot #n may include HARQ-ACKs corresponding to slot #(n−k). For example, when k∈{1, 2, 3, 4, 5, 6, 7, 8}, the HARQ-ACK information of slot #n includes HARQ-ACKs corresponding to slot #(n−8) to slot #(n−1) (i.e., the maximum number of HARQ-ACKs) regardless of actual DL data reception. Here, the HARQ-ACK information may be replaced with a HARQ-ACK codebook and a HARQ-ACK payload. Also, the slot may be understood as/replaced with a candidate occasion for DL data reception. As an example, the bundling window is determined based on the PDSCH-to-HARQ-ACK timing with respect to the HARQ-ACK slot, and the PDSCH-to-HARQ-ACK timing set may have pre-defined values (e.g., {1, 2, 3, 4, 5, 6, 7, 8}), or may be configured by higher layer signaling (RRC signaling). In the case of the dynamic HARQ-ACK codebook, the size of the HARQ-ACK payload to be reported by the UE may be dynamically changed by DCI or the like. In the dynamic HARQ-ACK codebook scheme, the DL scheduling DCI may include counter-DAI (i.e., c-DAI) and/or total-DAI (i.e., t-DAI). Here, DAI denotes a downlink assignment index, and is used for the BS to inform the UE of transmitted or scheduled PDSCH(s) which are be included in one HARQ-ACK transmission. In particular, c-DAI is an index indicating the order of PDCCHs carrying DL scheduling DCI (hereinafter, DL scheduling PDCCHs), and t-DAI is an index indicating the total number of DL scheduling PDCCHs up to the current slot in which a PDCCH with t-DAI is present.

In the NR system, implementing a plurality of logical networks on a single physical network is being considered. Here, a logical network should be capable of supporting services having various requirements (e.g., eMBB, mMTC, URLLC, etc.). Thus, the physical layer of NR is designed to support a flexible transmission structure in consideration of requirements for various services. As an example, the NR physical layer may change the OFDM symbol length (OFDM symbol duration) and subcarrier spacing (SCS) (hereinafter, OFDM numerology) as needed. Also, transmission resources of physical channels may be changed within a specific range (in units of symbols). For example, in NR, for the PUCCH (resource) and the PUSCH (resource), the transmission duration/transmission start time may be flexibly configured within a specific range.

In a wireless communication system including a BS and a UE, when the UE transmits UCI on a PUCCH, the PUCCH resource may overlap with other PUCCH resources or PUSCH resources in the time domain. For example, from the same UE perspective (or in the same slot), (1) a PUCCH (resource) and PUCCH (resource) (for different UCI transmissions), or (2) a PUCCH (resource) and a PUSCH (resource) may overlap with each other in the time domain. The UE may not support PUCCH-PUCCH simultaneous transmission or PUCCH-PUSCH simultaneous transmission (depending on limitation of UE capability or configuration information received from the BS). Also, the UE may not be allowed to simultaneously transmit multiple UL channels within a specific time range.

In present disclosure, methods for handling a plurality of UL channels to be transmitted by the UE when the plurality of UL channels is present in a specific time range are described. Also, in the present disclosure, methods for handling UCI and/or data that should be transmitted/received on the multiple UL channels are described. In the description of examples of the present disclosure, the following terms are used.

UCI: represents control information that the UE transmits on UL. The UCI includes various types of control information (i.e., UCI types). For example, the UCI may include HARQ-ACK (simply referred to as A/N, AN), SR, and/or CSI.

UCI multiplexing: may represent an operation of transmitting different UCIs (UCI types) on a common physical layer UL channel (e.g., PUCCH, PUSCH). UCI multiplexing may include an operation of multiplexing different UCIs (UCI types). For simplicity, the multiplexed UCI is referred to as MUX UCI. Also, UCI multiplexing may include an operation performed in relation to the MUX UCI. For example, UCI multiplexing may include an operation of determining UL channel resources for transmission of the MUX UCI.

UCI/data multiplexing: may refer to an operation of transmitting UCI and data on a common physical layer UL channel (e.g., PUSCH). UCI/data multiplexing may include an operation of multiplexing UCI and data. For simplicity, the multiplexed UCI is referred to as MUX UCI/data. In addition, the UCI/data multiplexing may include an operation performed in relation to MUX UCI/data. For example, the UCI/data multiplexing may include a procedure of determining UL channel resources to transmit the MUX UCI/data.

Slot: represents a basic time unit or time interval for data scheduling. A slot includes a plurality of symbols. Here, the symbol includes OFDM-based symbols (e.g., CP-OFDM symbols, DFT-s-OFDM symbols).

Overlapping UL channel resource(s): refers to resource(s) of UL channel (e.g., PUCCH, PUSCH) overlapping (at least partially) in the time domain within a predetermined time interval (e.g., slot). The overlapping UL channel resource(s) may mean UL channel resource(s) prior to UCI multiplexing. In the present disclosure, UL channels that (at least partially) overlap with each other in the time domain may be referred to as UL channels that collide in time or in the time domain.

Figure 9:
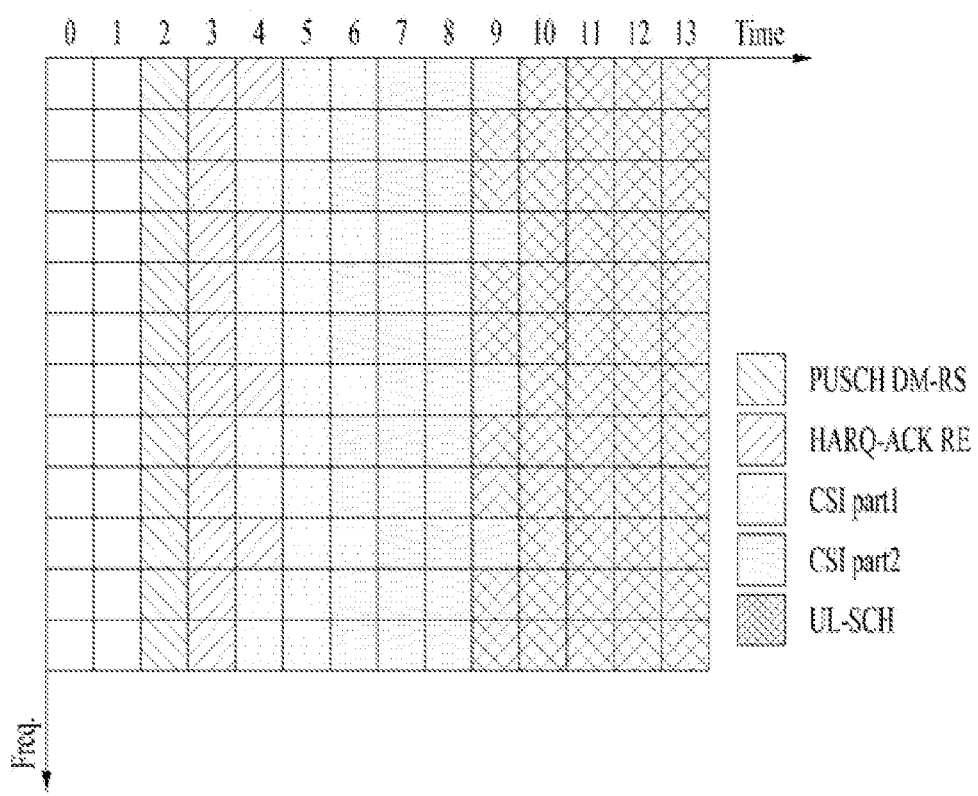
FIG. 9 illustrates an example of multiplexing UCI on a PUSCH.

FIG. 9 illustrates an example of multiplexing UCI on a PUSCH. When the PUCCH resource(s) overlap with the PUSCH resource in the slot and PUCCH-PUSCH simultaneous transmission is not configured, the UCI may be transmitted on the PUSCH as shown in the figure. Transmitting the UCI on the PUSCH is referred to as UCI piggyback or PUSCH piggyback. In particular, FIG. 9 illustrates a case where HARQ-ACK and CSI are carried on a PUSCH resource.

In order for the BS to properly receive the UL channel(s) transmitted by the UE when multiple UL channels overlap with each other within a predetermined time interval, a method for the UE to handle the multiple UL channels should be defined. Methods for handling collision between UL channels are described below.

Figure 10:
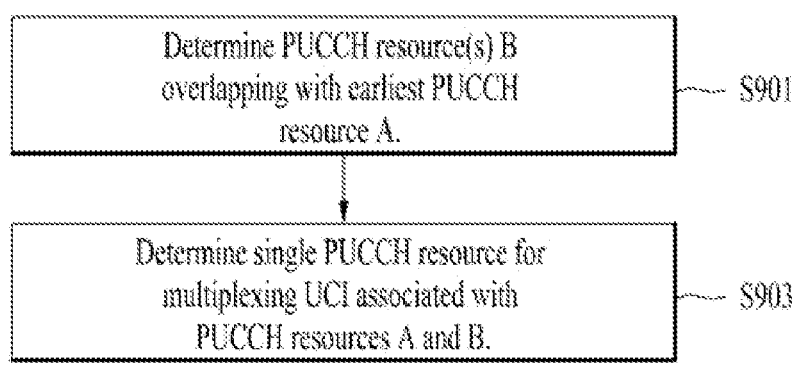
FIG. 10 illustrates an example of a procedure in which a UE with an overlapping PUCCH in a single slot handles collision between UL channels.

FIG. 10 illustrates an example of a procedure in which a UE with an overlapping PUCCH in a single slot handles collision between UL channels.

For UCI transmission, the UE may determine a PUCCH resource for each UCI. Each PUCCH resource may be defined by a start symbol and a transmission duration. When PUCCH resources for PUCCH transmissions overlap with each other in a single slot, the UE may perform UCI multiplexing based on the PUCCH resource having the earliest start symbol. For example, based on the PUCCH resource (hereinafter, PUCCH resource A) having the earliest start symbol in the slot, the UE may determine the overlapping PUCCH resource(s) (hereinafter, PUCCH resource(s) B) (in time) (S1101). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. The UE may determine a single PUCCH resource (hereinafter, MUX PUCCH resource) to multiplex UCI associated with the PUCCH resource A and the PUCCH resource(s) B (S1103). For example, the UE determines a PUCCH resource set (hereinafter, PUCCH resource set X) corresponding to the payload size of the MUX UCI among PUCCH resource sets configured for or available to the UE, and determines one of the PUCCH resources belonging to PUCCH resource set X as a MUX PUCCH resource. For example, the UE may determine one of the PUCCH resources belonging to PUCCH resource set X as a MUX PUCCH resource, using a PUCCH resource indicator field in the last DCI among the DCIs having a PDSCH-to-HARQ_feedback timing indicator field indicating the same slot for the PUCCH transmission. The UE may determine the total number of PRBs of the MUX PUCCH resource based on the payload size of the MUX UCI and the maximum code rate for the PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or the PUCCH resource having the earliest start symbol among the remaining PUCCH resources including the MUX PUCCH resource).

Figure 11:
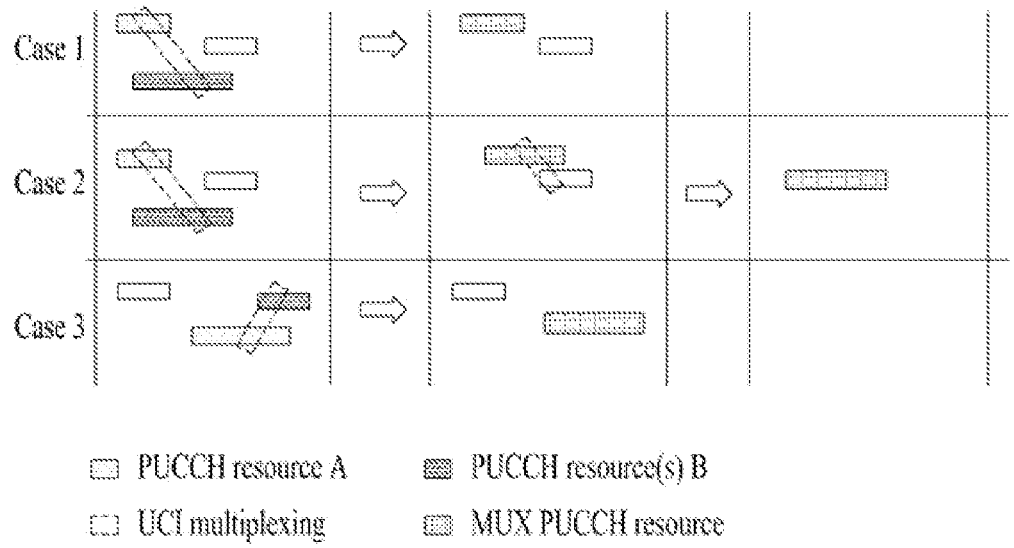
FIG. 11 illustrates cases of UCI multiplexing according to FIG. 9.

FIG. 11 illustrates cases of UCI multiplexing according to FIG. 9. Referring to FIG. 11, when a plurality of PUCCH resources overlap with each other in a slot, UCI multiplexing may be performed based on the earliest PUCCH resource A (e.g., the earliest start symbol). In FIG. 11, Case 1 and Case 2 represent a case where the first PUCCH resource overlaps with another PUCCH resource. In this case, the procedure of FIG. 9 may be performed, regarding the first PUCCH resource as the earliest PUCCH resource A. On the other hand, Case 3 represents a case where the first PUCCH resource does not overlap with other PUCCH resources, and the second PUCCH resource overlaps with other PUCCH resources. In Case 3, UCI multiplexing is not performed for the first PUCCH resource. Instead, the procedure of FIG. 9 may be performed, regarding the second PUCCH resource as the earliest PUCCH resource A. Case 2 is a case where the MUX PUCCH resource determined to transmit the multiplexed UCI newly overlaps with other PUCCH resources. In this case, the procedure of FIG. 9 may be additionally performed, regarding the MUX PUCCH resource (or the earliest PUCCH resource (e.g., the PUCCH resource having the earliest start symbol) among the remaining PUCCHs including the same) as the earliest PUCCH resource A.

Figure 12:
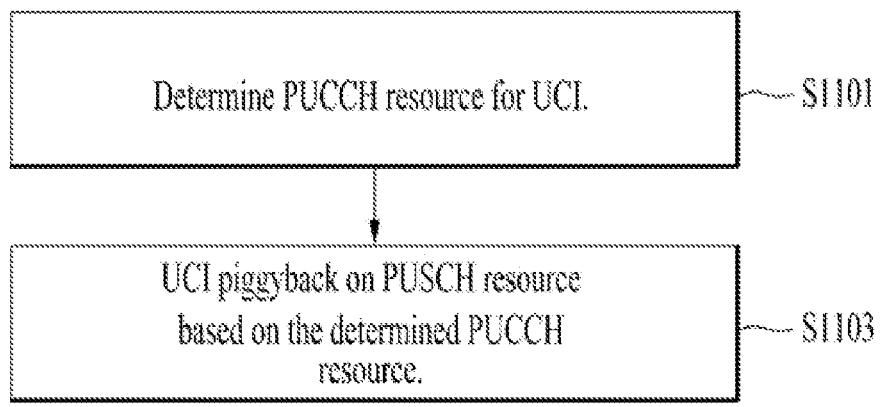
FIG. 12 illustrates a procedure in which a UE with PUCCH and PUSCH overlapping in a single slot handles collision between UL channels.

FIG. 12 illustrates a procedure in which a UE with PUCCH and PUSCH overlapping in a single slot handles collision between UL channels.

For UCI transmission, the UE may determine a PUCCH resource (S1301). Determining the PUCCH resource for UCI may include determining a MUX PUCCH resource. In other words, determining the PUCCH resource for the UCI by the UE may include determining the MUX PUCCH resource based on a plurality of overlapping PUCCHs in the slot.

The UE may perform UCI piggybacking on the PUSCH resource based on the determined (MUX) PUCCH resource (S1303). For example, when there is a PUSCH resource (on which multiplexed UCI transmission is allowed), the UE may apply a UCI multiplexing rule to the PUCCH resource(s) overlapping with the PUSCH resource (in the time domain). The UE may transmit the UCI on the PUSCH.

When there is no PUSCH overlapping with the determined PUCCH resource in the slot, S1503 may be skipped, and the UCI may be transmitted on the PUCCH.

When the determined PUCCH resource overlaps with a plurality of PUSCHs in the time domain, the UE may multiplex the UCI on one of the plurality of PUSCHs. For example, when the UE intends to transmit the plurality of PUSCHs in respective serving cells, the UE may multiplex the UCI on a PUSCH of a specific serving cell (e.g., a serving cell having the least serving cell index) among the serving cells. When there is more than one PUSCH in the specific serving cell, the UE may multiplex the UCI on the earliest PUSCH transmitted in the slot.

Figure 13:
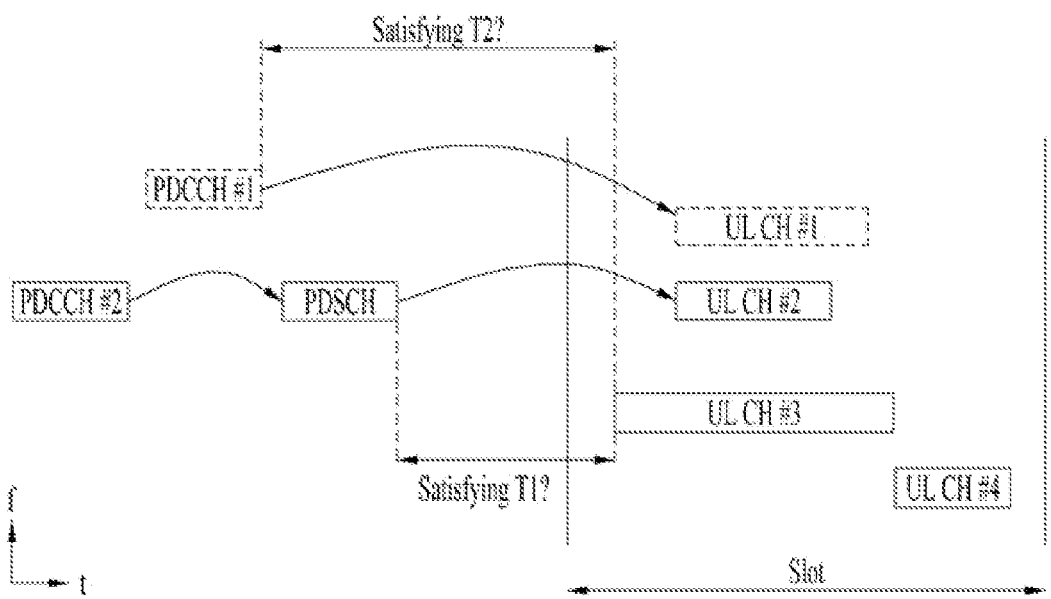
FIG. 13 illustrates UCI multiplexing considering the timeline condition.

FIG. 13 illustrates UCI multiplexing considering the timeline condition. When the UE performs UCI and/or data multiplexing for the PUCCH(s) and/or PUSCH(s) overlapping in the time domain, the processing time of the UE for UCI and/or data multiplexing may be insufficient due to flexible UL timing configuration for the PUCCH or PUSCH. In order to prevent the processing time of the UE from becoming insufficient, in the UCI/data multiplexing procedure for the PUCCH(s) and/or PUSCH(s) overlapping (in the time domain), the following two timeline conditions (hereinafter, multiplexing timeline conditions) are taken into consideration.

(1) The last symbol of the PDSCH corresponding to the HARQ-ACK information is received time N1+ earlier than the start symbol of the earliest channel among the overlapping PUCCH(s) and/or PUSCH(s) (in the time domain). T1 may be determined based on i) the minimum PDSCH processing time N1 defined according to the UE processing capability, and ii) d1 predefined as an integer greater than or equal to 0 according to the position of a scheduled symbol, the DMRS position within the PUSCH, BWP switching, etc.

For example, T1 may be determined as follows: T1=(N1+d1)*(2048+144)*κ*2−u*Tc. N1 is based on u in Tables 10 and 11 for UE processing capabilities #1 and #2, respectively, where p is the one resulting in the largest T1 among (μPDCCH, μPDSCH, μUL), where μPDCCH corresponds to the subcarrier spacing of the PDCCH for scheduling the PDSCH, μPDSCH corresponds to the subcarrier spacing of the scheduled PDSCH, μUL corresponds to the subcarrier spacing of the UL channel on which the HARQ-ACK is to be transmitted, and κ=Tc/Tf=64. In Table 10, for N1,0, if the PDSCH DMRS position l1=l2 for the additional DMRS, N1,0=14. Otherwise, N1,0=13 (see section 7.4.1.1.2 of 3GPP TS 38.211). For PDSCH mapping type A, if the last symbol of the PDSCH is in the i-th slot, d1=7-i for i<7. Otherwise, d1=0. When the PDSCH is of mapping type B for UE processing capability #1, it may be defined that d1=0 if the number of allocated PDSCH symbols is 7, d1=3 if the number of allocated PDSCH symbols is 4, and d1=3+d if the number of allocated PDSCH symbols is, where d is the number of overlapping symbols of the scheduling PDCCH and the scheduled PDSCH. When the PDSCH is of mapping type B for UE processing capability #2, it may be defined that d1=0 if the number of allocated PDSCH symbols is 7. If the number of allocated PDSCH symbols is 4, d1 may be the number of overlapping symbols of the scheduling PDCCH and the scheduled PDSCH. When the number of allocated PDSCH symbols is 2, it may be defined d1=3 if the scheduling PDSCH has been in a 3-symbol CORESET and the CORESET and the PDSCH have the same start symbol. Otherwise, d1 may be the number of overlapping symbols of the scheduling PDCCH and the scheduled PDSCH. In the present disclosure, T1 may be denoted as T_proc,1.

(2) The last symbol of the PDCCH indicating (e.g., triggering) PUCCH or PUSCH transmission is received time T2 before the start symbol of the earliest channel among the overlapping PUCCH(s) and/or PUSCH(s) (in the time domain). T2 may be determined based on i) the minimum PUSCH preparation time N2 defined according to the UE PUSCH timing capability, ii) d2 predefined as an integer greater than or equal to 0 according to the position of the scheduled symbol or BWP switching, etc. d2 may be divided into d2,1 related to the position of the scheduled symbol and d2,2 related to switching of the BWP.

For example, T2 may be determined as follows: T2=max{(N2+d2,1)*(2048+144)*κ*2−u*Tc, d2,2}. N2 is based on u in Tables 12 and 13 for UE timing capabilities #1 and #2, respectively, where μ is the one resulting in the largest T2 between (μDL, μUL), where μDL corresponds to the subcarrier spacing of the PDCCH carrying the DCI for scheduling the PUSCH, μUL corresponds to the subcarrier spacing of the PUSCH, and κ=Tc/Tf=64. If the first symbol of PUSCH assignment consists only of DM-RS, it may be defined that d2,1=0. Otherwise, it may be defined that d2,1=1. If the scheduling DCI has triggered switching of the BWP, d2,2 may be equal to the switching time. Otherwise, d2,2=0. The switching time may be defined differently depending on a frequency range. For example, the switching time may be set to 0.5 ms for the frequency range FR1 and may be set to 0.25 ms for the frequency range FR2. In the present disclosure, T2 may be denoted as T_proc,2.

The following tables exemplarily show processing times according to UE processing capabilities. In particular, Table 10 exemplarily shows PDSCH processing times for PDSCH processing capability #1 of the UE, and Table 11 exemplarily shows PDSCH processing times for PDSCH processing capability #2 of the UE. Table 12 exemplarily shows PUSCH preparation times for PUSCH timing capability #1 of the UE, and Table 13 exemplarily shows PUSCH preparation times for timing capability #2 of the UE.

TABLE 10

| | PDSCH decoding time N1 [symbols] | |
|---|---|---|
| u/SCS | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 11

| u/SCS | PDSCH decoding time N1 [symbols] |
|---|---|
| 0/15 kHz | 3 |
| 1/30 kHz | 4.5 |
| 2/60 kHz | 9 for frequency range 1 |

TABLE 12

| u/SCS | PUSCH preparation time N2 [symbols] |
|---|---|
| 0/15 kHz | 10 |
| 1/30 kHz | 12 |
| 2/60 kHz | 23 |
| 3/120 kHz | 36 |

TABLE 13

| u/SCS | PUSCH preparation time N2 [symbols] |
|---|---|
| 0/15 kHz | 5 |
| 1/30 kHz | 5.5 |
| 2/60 kHz | 11 for frequency range 1 |

When a UE configured to multiplex different UCI types within a PUCCH intends to transmit a plurality of overlapping PUCCHs in a slot or to transmit overlapping PUCCH(s) and PUSCH(s) in a slot, the UE may multiples the UCI types when specific conditions are satisfied. The specific conditions may include multiplexing timeline condition(s). For example, in FIGS. 9 to 12, PUCCH(s) and PUSCH(s) to which UCI multiplexing is applied may be UL channels that satisfy the multiplexing timeline condition(s). Referring to FIG. 13, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for the PDSCH. The PDSCH may be scheduled by PDCCH #2, and the resource of UL CH #2 may also be indicated by PDCCH #2.

In this case, when the UL channels (e.g., UL channels #1 to #3) overlapping in the time domain satisfy the multiplexing timeline condition, the UE may performs UCI multiplexing for UL channels #1 to #3 overlapping in the time domain. For example, the UE may check whether the first symbol of UL CH #3 satisfies the T1 condition based on the last symbol of the PDSCH. Also, the UE may check whether the first symbol of UL CH #3 satisfies the T2 condition based on the last symbol of PDCCH #1. When the multiplexing timeline condition is satisfied, the UE may perform UCI multiplexing for UL channels #1 to #3. On the other hand, when the earliest UL channel (e.g., the UL channel having the earliest start symbol) among the overlapping UL channels does not satisfy the multiplexing timeline condition, the UE may not be allowed to multiplex the corresponding UCI types.

Figure 14:
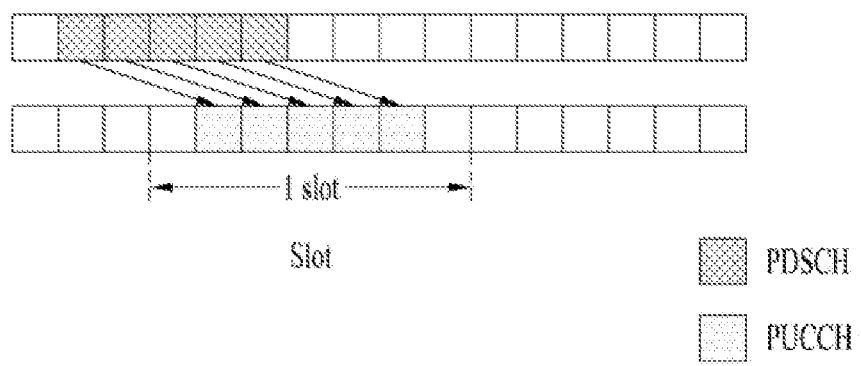
FIG. 14 illustrates transmission of a plurality of HARQ-ACK PUCCHs in a slot.

FIG. 14 illustrates transmission of a plurality of HARQ-ACK PUCCHs in a slot.

The current NR standard document (e.g., 3GPP TS 38.213 V15.2.0) specifies that the UE does not expect to transmit more than one PUCCH with HARQ-ACK information in a slot. Therefore, according to the current NR standard document, the UE may transmit at most one PUCCH with HARQ-ACK information in a slot. In order to prevent the UE from failing to transmit HARQ-ACK information due to the limitation of the number of HARQ-ACK PUCCHs that the UE may transmit, the BS needs to perform downlink scheduling such that the HARQ-ACK information may be multiplexed on one PUCCH resource. However, considering a service with strict latency and reliability requirements, such as a URLLC service, concentrating a plurality of HARQ-ACK feedbacks on only one PUCCH in a slot may not be desirable in terms of PUCCH performance. In addition, in order to support a latency-critical service, the BS may be required to schedule a plurality of consecutive PDSCHs having a short duration in one slot. Even when the UE is allowed to transmit PUCCH in any symbol(s) in the slot by the configuration/instruction of the BS, it may not be possible that the BS quickly schedules PDSCHs in a back-to-back manner and the UE quickly feeding back HARQ-ACK, if only one HARQ-ACK PUCCH transmission is allowed in the slot. Therefore, for more flexible and efficient use of resources and service support, it is preferable that a plurality of HARQ-ACK PUCCHs (or PUSCHs) (which do not overlap with each other) is allowed to be transmitted in one slot, as illustrated in FIG. 14.

1. UCI Multiplexing for PUCCH/PUSCH

Example 1-1

Disclosed below are various implementations for operations of the UE performed when a plurality of UCIs (e.g., HARQ-ACK/CSI/SR) having different target service, and/or qualities of service (QoSs) and/or block error rate (BLER) requirements, and/or transmission reliability requirements, and/or latency requirements, and/or processing times is transmitted on one UL channel (or a plurality of UL channels) (e.g., PUCCH/PUSCH). Also, the BS may receive a UL channel in anticipation of the UE operation disclosed below. Hereinafter, the target service, and/or QoS, and/or BLER requirement, and/or transmission reliability requirement, and/or latency requirement, and/or processing time may be collectively referred to as channel-related elements. In the present disclosure, a priority of a channel or a signal may be configured or determined based on the channel-related elements.

As an implementation of the present disclosure, the UE may receive a configuration of a plurality of maximum coding rates for each PUCCH format/resource (set) from the BS. Here, the plurality of maximum coding rates may be applied to/configured for different channel-related elements and/or UCIs corresponding to UCI types, respectively. Total coded bits or total REs may be derived based on the number of required coded bits or the number of required coded REs calculated based on the plurality of maximum coding rates, and the number of RBs of the PUCCH resource may be determined based on the derived total coded bits or the total REs.

In particular, when a UCI combination to be transmitted on a UL channel includes only eMBB UCIs or URLLC UCIs, the number of coded REs may be calculated based on the coding rate r1 or r2 for each case, and the number of RBs corresponding to the calculated number of REs may be determined as the number of RBs for one UL channel. On the other hand, when eMBB UCI and URLLC UCI are multiplexed on one UL channel, a rule may be defined as follows. The required coded bit (or required coded RE) for the eMBB UCI shall be calculated based on r1, and the required coded bit (or required coded RE) for the URLLC UCI shall be calculated based on r2. The number of RBs in one of the plurality of PUCCH resources and/or the number of RBs in the PUCCH resource shall be determined based on the total coded bit (or total RE) obtained by adding the calculated required coded bits.

If the number of RBs for the PUCCH derived by the above method is greater than the maximum number of RBs configured through a higher layer signal, a UCI corresponding to a specific (e.g., low priority) channel-related element and/or UCI type may be dropped preferentially and only the remaining (e.g., high priority) UCIs may be multiplexed in UL channel transmission. Alternatively, assuming a PUCCH resource corresponding to the maximum number of RBs configured through a higher layer signal, a rule for reducing the bits of the remaining (low priority) UCIs such that the coding rate is less than or equal to the coding rate of a UCI corresponding to a specific (e.g., high priority) channel-related element and/or UCI type may be defined.

As described above, when a UCI combination to be transmitted on one UL channel is dynamic/variable according to the scheduling situation of the BS, that is, the combination includes only eMBB UCIs, only URLLC UCIs, or both eMBB UCI and URLLC UCI, inconsistency is likely to occur between the UCI combination transmitted by the UE and the UCI combination that the BS expects to receive. For example, the BS may schedule both DL data corresponding to eMBB and URLLC and expect to receive HARQ-ACK feedback for the two service types (that is, the UCI combination includes both eMBB UCI and URLLC UCI). On the other hand, the UE may fail to detect the eMBB scheduling DCI and may thus transmit only HARQ-ACK feedback for the DL data corresponding to the URLLC (that is, the UCI combination includes only URLLC UCI). Thereby, inconsistency may occur.

In consideration of the possibility of such inconsistency, the position of the starting RE (and OFDM symbol) to which the UCI corresponding to the specific service type A is mapped on a UL channel may always be fixed/deterministically determined so as not to be determined differently depending on whether the UCI corresponding to the other service type B is mapped to the RE, namely, may be determined irrespective of whether the UCI corresponding to the other service type B is mapped to the RE. Specifically, for a given UL channel resource, the starting RE (and OFDM symbol) position to which the UCI corresponding to the eMBB (or URLLC) is mapped may be invariably determined to be the same RE (and OFDM symbol) index regardless of whether the UCI corresponding to the URLLC (or eMBB) is mapped to the RE.

Also, a rule may be defined such that mapping of a specific UCI (UCI 1) for a given UL channel resource does not intrude into the mapping area of a UCI (UCI 2) corresponding to a different channel-related element and/or UCI type. This may be intended to ensure transmission reliability of UCI 2. For example, the UE may set an upper limit related to calculation of the number of coded bits of UCI 1, considering the number of coded bits of UCI 2, thereby preventing the mapping from intruding into the mapping area of UCI 2.

Alternatively, a PUCCH resource/PUCCH resource set related to the UL channel may be separately (differently) configured for each UCI combination to be transmitted on one UL channel or the number of UCIs in the UCI combination. Accordingly, the UE may select a PUCCH resource/PUCCH resource set for each UCI combination to be transmitted on a UL channel or the number of UCIs in the UCI combination and transmit the UCI combination.

According to another implementation of the present disclosure, in mapping a coded bit for a UCI corresponding to a different channel-related element and/or UCI type to a PUCCH resource (PRB) finally determined for UCI transmission or to a UCI RE set on the finally determined PUSCH, a rule may be defined such that only UCI having a higher priority shall be mapped to an RE overlapping with the UCI mapping (e.g., UCI mapping of a lower priority is skipped).

Here, regarding the priority of the applied UCI, the priorities according to the UCI type may be applied first (e.g., the priorities may be applied in order of HARQ-ACK>SR>CSI). When the UCI type is the same, the priority of the UCI may be determined according to the channel-related element (e.g., the priorities may be applied in order of URLLC>eMBB).

According to another implementation of the present disclosure, when a separate independent PUCCH resource (or resource set) is configured/operated for different channel-related elements, a maximum coding rate for UCI may be set for each PUCCH resource (set)/PUCCH format configured for each channel-related element. That is, the maximum coding rate may be set for a PUCCH resource (set)/PUCCH format for a specific channel-related element.

According to another implementation of the present disclosure, when a separate independent PUCCH resource (or resource set) is configured/operated for a different channel-related element or each codebook corresponding to a different channel-related element, the range of a payload may be configured differently for each PUCCH resource (or resource set)/PUCCH format configured for each channel-related element or the codebook corresponding to each channel-related element. In other words, the range of the payload associated with the PUCCH resource set configured for each channel-related element may be configured differently based on the priority of the PUCCH resource set configured for each channel-related element.

For example, a range of a UCI payload associated with a PUCCH resource set associated with a URLLC having a relatively high priority may be configured to include a smaller payload size that a range of a payload associated with a PUCCH resource set associated with an eMBB having a relatively low priority. For example, when the range of a payload associated with a PUCCH resource set associated with eMBB is set to (number of UCI bits>a), the range of a payload associated with a PUCCH resource set associated with URLLC may be set to (number of UCI bits=<a).

In addition, when a plurality of PUCCH resource sets is associated with each of the target services (e.g., URLLC, eMBB), the size of the range of the payload associated with the PUCCH resource set (i.e., the width of the range of the payload) may be set differently according to the target services. For example, when the size of the range of the payload associated with each of the PUCCH resource sets #1 and #2 associated with the eMBB is set to A, the size of the range of the payload associated with each of the PUCCH resource sets #1 and #2 associated with the URLLC may set to a value less than A. That is, the range of the payload of the PUCCH resource sets associated with the URLLC may be more subdivided.

This is because, in the case of the URLLC, the objective may be to further reduce latency, and thus it may be more efficient to frequently report HARQ-ACK with a smaller payload size than in the case of the eMBB.

When a plurality of PUCCHs to be used overlap in time When a separate independent PUCCH resource (or resource set) is configured/operated for a different channel-related element or each codebook corresponding to the different channel-related element, if a plurality of PUCCHs corresponding to different channel-related elements or codebooks corresponding to the different channel-related elements overlap with each other in the time domain, the UE may multiplex and transmit the payloads of the respective PUCCHs on one PUCCH. If a different PUCCH resource set is configured and/or a different payload range is configured for each channel-related element or codebook corresponding to the channel-related element, ambiguity may occur regarding a PUCCH resource set that corresponds to a channel-related element or a codebook corresponding to the channel-related element and forms the basis of determination of a new PUCCH resource for the multiplexing. Accordingly, a PUCCH resource set that corresponds to a channel-related element or a codebook corresponding to the channel-related element and forms the basis of determination of a new PUCCH resource may be determined based on one or a combination of part/all of options 1 to 3 disclosed below.

* Option 1

In option 1, when a plurality of PUCCH resource sets is configured for the UE, one PUCCH resource set to be used for multiplexing may be determined based on a PUCCH resource set corresponding to a channel-related element of a higher priority or a codebook corresponding to the channel-related element among the plurality of PUCCH resource sets.

For example, the UE may use at least one PUCCH resource set corresponding to a predetermined priority for multiplexing among the plurality of configured PUCCH resource sets. Here, the predetermined priority may be the highest priority. In addition, when the at least one PUCCH resource set corresponding to the predetermined priority includes a plurality of sets (namely, a plurality of PUCCH resource sets has the same priority), the UE may determine, according to the payload size of the UCI (i.e., MUX UCI) derived by multiplexing, a PUCCH resource set having a payload range including the payload size of the MUX UCI among the plurality of PUCCH resource sets having the same priority as a PUCCH resource set to be used for multiplexing.

In option 1, which is intended to ensure that the coding rate does not exceed a specific coding rate even after multiplexing, a PUCCH resource set to be actually used may be determined based on the PUCCH resource set corresponding to a higher priority service for which a PUCCH resource se is expected to be configured targeting a lower coding rate, or corresponding to a codebook corresponding to the higher priority service.

* Option 2

In option 2, when a plurality of PUCCH resource sets is configured for the UE, one PUCCH resource set to be used for multiplexing may be determined based on a PUCCH resource set corresponding to a channel-related element of a lower priority or a codebook corresponding to the channel-related element among the plurality of PUCCH resource sets.

For example, the UE may use at least one PUCCH resource set corresponding to a predetermined priority for multiplexing among the plurality of configured PUCCH resource sets. Here, the predetermined priority may be the lowest priority. In addition, when the at least one PUCCH resource set includes a plurality of sets (namely, a plurality of PUCCH resource sets has the same priority), the UE may determine, according to the payload size of the UCI (i.e., MUX UCI) derived by multiplexing, a PUCCH resource set having a payload range including the payload size of the MUX UCI among the plurality of PUCCH resource sets having the same priority as a PUCCH resource set to be used for multiplexing.

In option 2, because multiplexing will increase the payload, a PUCCH resource set to be actually used may be determined based on the PUCCH resource set corresponding to a lower priority service for which a PUCCH resource is expected to be configured targeting a larger payload, or corresponding to a codebook corresponding to the lower priority service.

* Option 3

In option 3, a PUCCH resource set to be actually used may be determined according to the payload derived by multiplexing based on a PUCCH resource set that corresponds a channel-related element to which a PUCCH having an earlier start symbol, that is, a start symbol positioned relatively earlier in the time domain belongs, or corresponds to a codebook corresponding to the channel-related element.

Once a PUCCH resource set is determined among a plurality of PUCCH resource sets based on options 1 to 3, the UE may determine one of the PUCCH resources belonging to the PUCCH resource set as a MUX PUCCH resource based on the PUCCH resource indicator included in the downlink signal (e.g., DCI) received from the BS.

Figure 15:
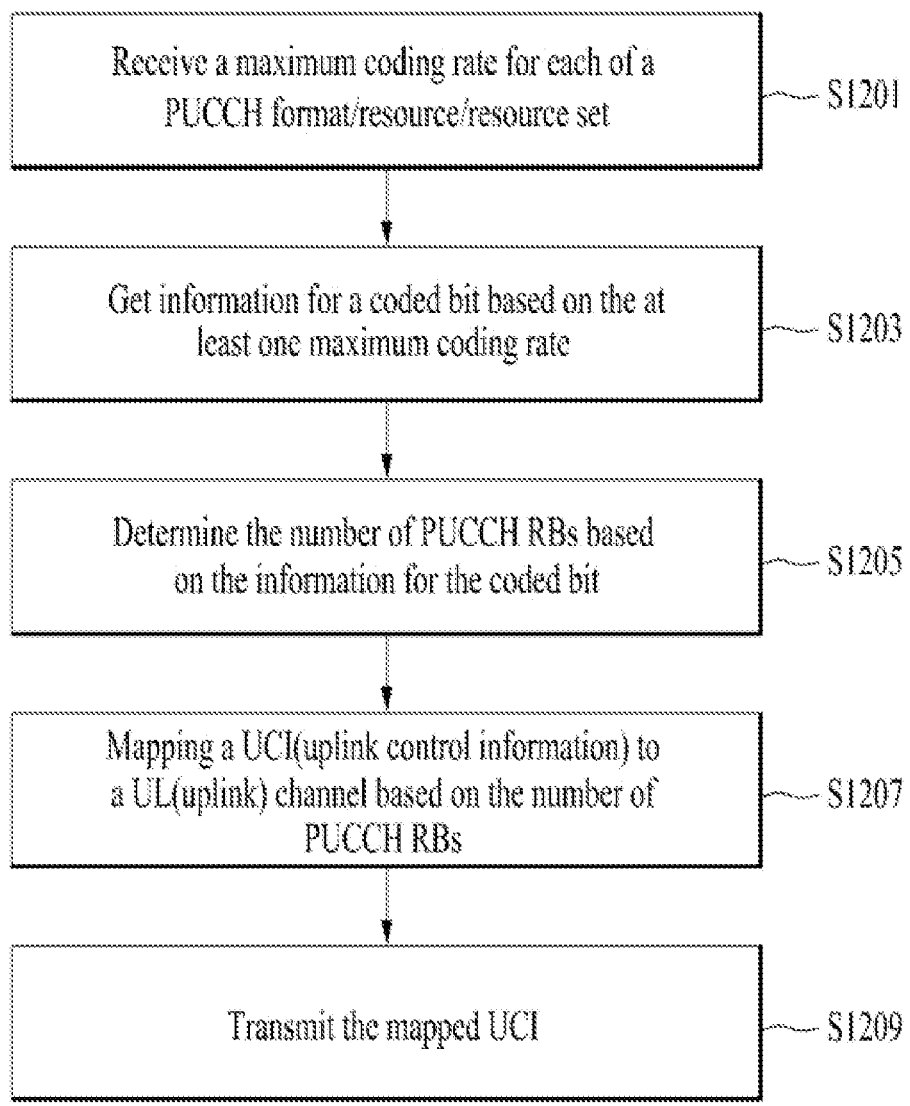
FIG. 15 is a flowchart of an operation of a UE related to UCI multiplexing according to an example of the present disclosure.

FIG. 15 is a flowchart of an operation of a UE related to UCI multiplexing according to an example of the present disclosure.

A specific operation of the UE according to FIG. 15 may be based on various implementations disclosed in Example 1-1 described above. Each PUCCH format/resource/resource set configured in FIG. 15 may be configured differently for each PUCCH format/resource/resource set according to the various implementations disclosed in Example 1-1 described above, based on the signal characteristics (e.g., channel-related elements, etc.). In addition, a PUCCH format/resource/resource set to be used may be determined based on the various implementations disclosed in Example 1-1 described above.

Referring to FIG. 15, in S1201, the UE may receive at least one configured maximum coding rate for each PUCCH format/resource/resource set from the BS. In S1203, the UE may acquire information related to coded bits based on the configured maximum coding rate. As an example, the information related to the coded bits may be the number of coded bits calculated based on the maximum coding rate. In S1205, the UE may determine the number of PUCCH RBs based on the information related to the coded bits. In S1207, the UE may map the UCI to the UL channel based on the number of PUCCH RBs. In S1209, the UE may transmit the mapped UCI to the BS.

Figure 16:
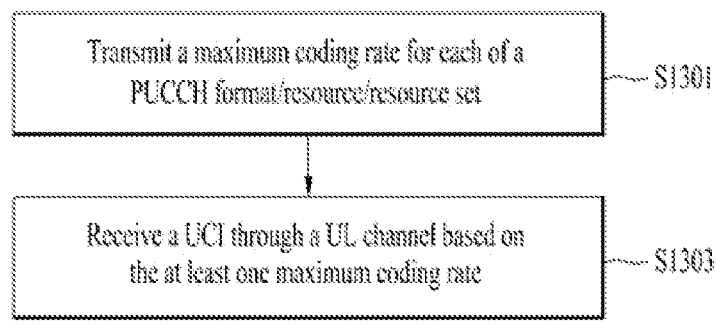
FIG. 16 is a flowchart of an operation of a BS related to UCI multiplexing according to an example of the present disclosure.

FIG. 16 is a flowchart of an operation of a BS related to UCI multiplexing according to an example of the present disclosure.

A specific operation of the BS according to FIG. 16 may be based on various implementations disclosed in Example 1-1 described above. For each PUCCH format/resource/resource set, the BS may establish a different configure for each PUCCH format/resource/resource set according to the various implementations of Example 1-1 described above, based on the signal characteristics (e.g., channel-related elements, etc.). In addition, a PUCCH format/resource/resource set to be used may be determined based on the various implementations of Example 1-1 described above.

Referring to FIG. 16, in S1301, the BS may configure at least one maximum coding rate for each PUCCH format/resource/resource set for the UE. In S1303, the BS may receive UCI from the UE on a UL channel (i.e., the UCI mapped to the UL channel) based on the at least one maximum coding rate.

Example 1-2

Disclosed below are various implementations for operations of the UE performed in determining parameters (e.g., a beta offset and/or a scaling factor alpha) used to calculate the number of coded modulation symbols (e.g., the number of REs) for UCI transmission within the PUSCH when a plurality of UCIs having different channel-related elements and/or UCI types is transmitted on one channel (or a plurality of channels) (e.g., PUSCH). The BS may receive a UL channel in anticipation of the operation of the UE. The various implementations disclosed in Example 1-2 may be intended to avoid an increase in signaling overhead by preventing a beta offset indicator field from being added to a UL grant DCI for scheduling a PUSCH when a specific channel-related element and/or UCI type corresponds to each of the UCI and the PUSCH.

According to an implementation of the present disclosure, a set of parameters (e.g., beta offset and/or scaling factor alpha) used to calculate the number of coded modulation symbols (e.g., the number of REs) for UCI transmission within the PUSCH may be configured separately for each channel-related element and/or UCI type of the UCI to be multiplexed on the PUSCH. The UE may determine a parameter set configured based on the channel-related element and/or UCI type of the UCI to be multiplexed as a parameter set of the UCI to be multiplexed, and perform transmission using a parameter corresponding to a specific parameter indicated by one field (i.e., a state indicated by the DCI field) for UCI transmission in the UL grant DCI among a plurality of parameters included in the determined parameter set. Specifically, when a set of beta offsets for eMBB HARQ-ACK is configured as {a, b, c, d} and a set of beta offsets for URLLC HARQ-ACK is configured as {e, f, g, h}, if a first state of the set of beta offsets is indicated by the beta offset indicator of the DCI, beta offset=a may be used for the eMBB HARQ-ACK, and beta offset=e may be used for the URLLC HARQ-ACK.

According to another implementation of the present disclosure, a set of parameters (e.g., beta offset and/or scaling factor alpha) used to calculate the number of coded modulation symbols (e.g., the number of REs) for UCI transmission within the PUSCH may be configured separately for each channel-related element of the PUSCH onto which the UCI is to be mapped (i.e., multiplexed).

The UE may determine a parameter set to be used for multiplexing among a plurality of parameter sets configured for each channel-related element of a PUSCH based on a property of a UL grant DCI for scheduling a PUSCH to which the UCI is to be mapped, and may perform UCI transmission using a parameter corresponding to a specific parameter indicated by one field included in the UL grant DCI (i.e., a state indicated by the DCI field) among the plurality of parameters included in the determined parameter set.

The parameter set to be used for multiplexing may be determined based on a property of DCI such as a specific field of the UL grant DCI, a search space of PDCCH including the UL grant DCI, a CORESET to which the PDCCH including the UL grant DCI belongs, RNTI, a DCI format, or CRC masking of PDCCH.

According to another implementation of the present disclosure, a set of parameters (e.g., beta offset and/or scaling factor alpha) used to calculate the number of coded modulation symbols (e.g., the number of REs) for UCI transmission within the PUSCH may be configured separately for each combination of a channel-related element and/or UCI type of the UCI to be multiplexed and a channel-related element of the PUSCH. The UE may determine a parameter set to be used for multiplexing among a plurality of configured parameter sets based on "a specific field of UL grant DCI for scheduling the PUSCH, or a PDCCH search space including the UL grant DCI, or a CORESET or RNTI to which the PDCCH including the UL grant DCI belongs, or a DCI format, or CRC masking of the PDCCH," and/or "a channel-related element and/or UCI type associated with the UCI," and/or "the channel-related element of the PUSCH", and may perform UCI transmission using a parameter corresponding to a specific parameter indicated by one field included in the UL grant DCI (i.e., a state indicated by the DCI field) among the plurality of parameters included in the determined parameter set.

Specifically, a set of parameters (e.g., beta offset and/or scaling factor alpha) used to calculate the number of coded modulation symbols (e.g., the number of REs) for UCI transmission within the PUSCH may be separately configured for each of {eMBB PUSCH, eMBB HARQ-ACK}, {eMBB PUSCH, URLLC HARQ-ACK}, {URLLC PUSCH, eMBB HARQ-ACK}, and {URLLC PUSCH, URLLC HARQ-ACK}. Also, a parameter set to be used for multiplexing may be determined among the four parameter sets by a combination of transmission PUSCH and UCI, based on "a specific field of UL grant DCI for scheduling the PUSCH, or a PDCCH search space including the UL grant DCI, or a CORESET or RNTI to which the PDCCH including the UL grant DCI belongs, or a DCI format, or CRC masking of the PDCCH", and/or "a channel-related element and/or UCI type associated with the UCI," and/or the channel-related element of the PUSCH. Also, a parameter corresponding to a state indicated by one field included in the DCI among a plurality of parameters included in the determined parameter set may be used. For example, when a parameter set to be used for multiplexing is determined by a combination of a channel-related element associated with the UCI and a channel-related element associated with the PUSCH, if the UCI to be multiplexed is eMBB HARQ-ACK and the PUSCH is eMBB PUSCH, the parameter set configured in {eMBB PUSCH, eMBB HARQ-ACK} may be determined as a parameter set to be used for multiplexing.

Alternatively, a set of parameters (e.g., beta offset and/or scaling factor alpha) used to calculate the number of coded modulation symbols (e.g., the number of REs) for UCI transmission within the PUSCH may be separately configured for each of {eMBB PUSCH, eMBB HARQ-ACK}, {eMBB PUSCH, URLLC HARQ-ACK}, {URLLC PUSCH, eMBB HARQ-ACK}, {URLLC PUSCH, URLLC HARQ-ACK}, {eMBB PUSCH, eMBB HARQ-ACK+URLLC HARQ-ACK}, and {URLLC PUSCH, eMBB HARQ-ACK+URLLC HARQ-ACK}. Also, a parameter set to be used for multiplexing may be determined among the six parameter sets by a combination of transmission PUSCH and UCI, based on "a specific field of UL grant DCI for scheduling the PUSCH, or a PDCCH search space including the UL grant DCI, or a CORESET or RNTI to which the PDCCH including the UL grant DCI belongs, or a DCI format, or CRC masking of the PDCCH", and/or "a channel-related element and/or UCI type associated with the UCI," and/or the channel-related element of the PUSCH. Also, a parameter corresponding corresponding to a state indicated by one field included in the DCI among a plurality of parameters included in the determined parameter set may be used. For example, when a parameter set to be used for multiplexing is determined by a combination of a channel-related element associated with the UCI and a channel-related element associated with the PUSCH, if the UCIs to be multiplexed are eMBB HARQ-ACK and URLLC HARQ-ACK, and the PUSCH is URLLC PUSCH, the parameter set configured in {URLLC PUSCH, eMBB HARQ-ACK+URLLC HARQ-ACK} may be determined as a parameter set to be used for multiplexing.

Figure 17:
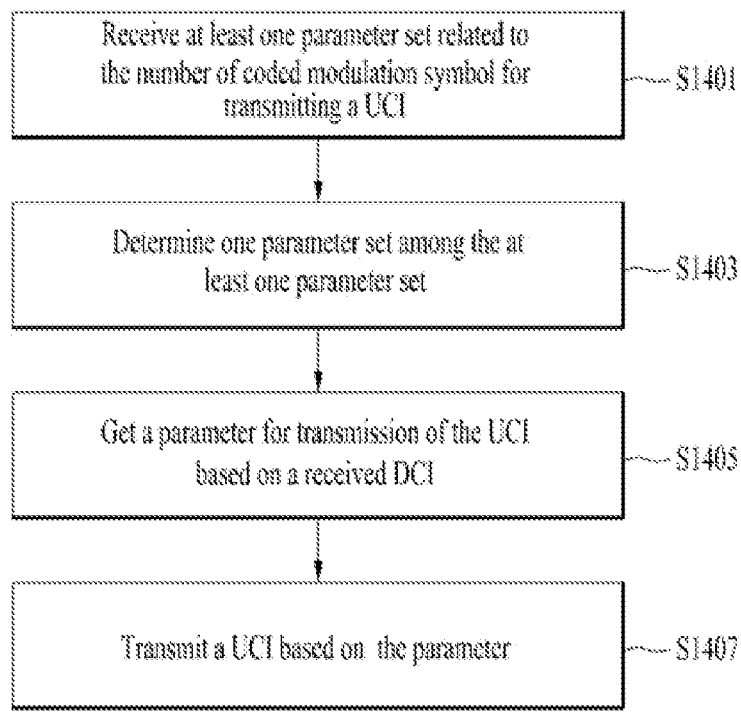
FIG. 17 is a flowchart of an operation of a UE related to UCI multiplexing according to another example of the present disclosure.
Figure 18:
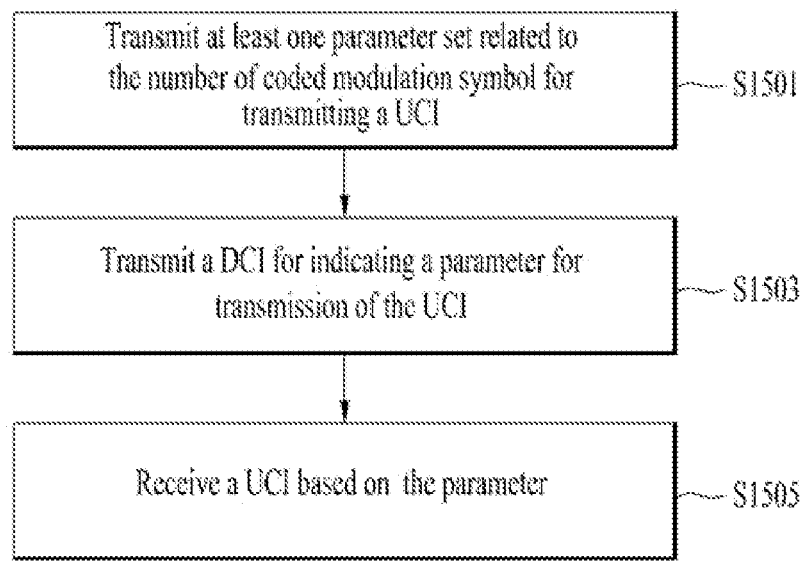
FIG. 18 is a flowchart of an operation of a BS related to UCI multiplexing according to another example of the present disclosure.

FIG. 17 is a flowchart of an operation of a UE related to UCI multiplexing according to another example of the present disclosure, and FIG. 18 is a flowchart of an operation of a BS related to UCI multiplexing according to another example of the present disclosure.

The operations of the UE and the BS of FIGS. 17 and 18 may be performed based on various implementations of Example 1-2 described above.

Referring to FIG. 17, in S1401, the UE may receive configuration of at least one parameter set related to the number of coded modulation symbols for UCI transmission from the BS. In S1403, the UE may determine a parameter set to be used for multiplexing between the at least one configured parameter set. In S1405, the UE may acquire a parameter to be used for UCI transmission in the determined parameter set based on the DCI received from the BS. In S1407, the UE may transmit the UCI to the BS based on the acquired parameter.

Referring to FIG. 18, in S1501, the BS may configure at least one parameter set related to the number of coded modulation symbols for the UE. In S1503, the BS may transmit, to the UE, DCI for indicating a parameter to be used for UCI transmission. In S1505, the BS may receive UCI transmitted from the UE based on the indicated parameter.

Example 1-3

In Example 1-3, various implementations of the operation of the UE performed when multiple UCIs having different priorities, and/or channel-related elements, and/or UCI types are transmitted by piggybacking on one PUSCH (or multiple PUSCHs) are disclosed. The BS may receive a UL channel in anticipation of the UE operation. The implementations disclosed in Example 1-3 may be intended for reliable transmission for UCI with a high priority when the processing time is not sufficient when the UE performs a timeline check for UCI piggyback. Here, the timeline check may be an operation of checking whether multiple UL channels satisfy the above-described multiplexing timeline condition. The implementations disclosed in Example 1-3 may be applied not only to the piggyback operation, but also to multiplexing for multiple PUCCHs.

According to an implementation of the present disclosure, the piggyback operation of the UE may be independently (and differently) defined for each UCI type and/or channel-related element of UCI. Specifically, the UE may be configured/defined to perform the piggyback operation differently depending on the number of bits of UCI for a UCI with a low priority, and may be configured/defined to perform the same piggyback operation for a UCI with a high priority regardless of the number of bits of the UCI.

For example, for eMBB HARQ-ACK, when the number of bits of UCI is fewer than or equal to 2-bits, the UE may be configured/defined to cause the eMBB HARQ-ACK to piggyback on the PUSCH based on puncturing. When the number is more than 2-bits, the UE may be configured/defined to cause the eMBB HARQ-ACK to piggyback on the PUSCH based on rate-matching. That is, for a UCI having a low priority, the UE may perform piggyback by puncturing or rate-matching the PUSCH resource region to which the UCI is to be mapped according to the number of bits of the UCI.

For the URLLC HARQ-ACK, the UE may be configured/defined to cause the URLLC HARQ-ACK to piggyback on the PUSCH based on puncturing regardless of the number of bits. That is, for a UCI having a high priority, the UE may perform piggyback by puncturing the PUSCH resource region to which the UCI is to be mapped.

According to another implementation of the present disclosure, the UE may determine whether multiple UL channels (e.g., PUCCH and PUSCH) satisfy a predetermined multiplexing timeline condition based on the multiple UL channels overlapping in the time domain, and perform the piggyback operation depending on whether the predetermined multiplexing timeline condition is satisfied. When the multiple UL channels satisfy the predetermined multiplexing timeline condition, at least one UCI associated with the UL channels may be caused to piggyback on the PUSCH. In this case, the piggyback operation may be performed based on puncturing or rate matching regardless of the priority configured for the UCI based on the channel-related element and/or the UCI type.

When the multiple UL channels fail to satisfy the predetermined multiplexing timeline condition, at least one UCI associated with the UL channels may be caused to piggyback on the PUSCH based on the priority associated with the UCI. Specifically, the UE may determine whether the difference in time between the earliest time of the PUCCH and PUSCH overlapping in the time domain, that is, the first symbol (i.e., the start symbol) of the channel transmitted earlier in the time domain and the last symbols of the PDSCH (e.g., PDSCH corresponding to HARQ-ACK) associated with the PUCCH and/or the PUSCH is less than or equal to a predetermined value (e.g., $T_{proc,1}^{mux}=(N_1+d_{1,1}+1)\cdot(2048+144)\cdot\kappa\cdot 2^{-\mu}\cdot T_C$ in 9.2.5 of TS 38.213), and/or whether the difference in time between the start symbol of the channel transmitted earlier in the time domain between the PUCCH and PUSCH overlapping in time and the last symbol of the PDCCH (for the purpose of scheduling the PDSCH, scheduling the PUSCH, and releasing the SPS PDSCH) is less than or equal to a predetermined value (e.g., $T_{proc,2}^{mux}=\max((N_2+d_{2,1}+1)\cdot(2048+144)\cdot\kappa\cdot 2^{-\mu}\cdot T_C, d_{2,2})$, $T_{proc,release}^{mux}=(N+1)\cdot(2048+144)\cdot\kappa\cdot 2^{-\mu}\cdot T_C$, or $T_{proc,CSI}^{mux}=\max((Z+d)\cdot(2048+144)\cdot\kappa\cdot 2^{-\mu}\cdot T_C, d_{2,2})$ in 9.2.5 of TS 38.213). When the difference in time is less than or equal to the predetermined value, the UE may perform puncturing on the PUSCH resource region for UCI mapping of a specific UCI type (e.g., HARQ-ACK) regardless of the number of bits. Alternatively, the UE may perform puncturing on the PUSCH resource region for UCI mapping (e.g., URLLC HARQ-ACK) for a specific channel-related element and/or UCI type. Here, the UCI for the specific channel-related element may be a UCI whose related priority corresponds to a predetermined priority (e.g., the highest priority) based on the channel-related element.

In addition, in the case of mapping of the remaining UCIs except for the UCI corresponding to the piggyback operation, that is, in piggybacking of the remaining UCIs, the UE may determine whether to perform puncturing/rate-matching on the PUSCH resource region to which the remaining UCIs are to be mapped based on the number of bits of the remaining UCIs, may perform rate-matching regardless of the number of bits of the remaining UCIs, or may drop the remaining UCIs regardless of the number of bits of the remaining UCIs.

According to another implementation of the present disclosure, in the timeline check for the piggyback operation, if the difference in time between the earliest time of multiple UL channels (e.g., PUCCH and PUSCH) overlapping in the time domain, that is, the start symbol of the channel transmitted earlier in the time domain and the last symbol of the PDSCH (e.g., PDSCH corresponding to HARQ-ACK) associated with the PUCCH and/or the PUSCH is less than or equal to the pre-defined/agreed/configured/indicated difference in time, and/or the difference in time between the start symbol of a channel transmitted earlier in the time domain among the plurality of UL channels overlapping in the time domain and the last symbol of the PDCCH (for the purpose of scheduling the PDSCH, scheduling the PUSCH, and releasing the SPS PDSCH) is less than or equal to a pre-defined/agreed/configured/indicated difference in time, a rule may be defined such that the UE performs an additional timeline check.

Specifically, the UE may sequentially remove multiple UL channels (PUCCH and PUSCH) overlapping in the time domain one by one, starting with a channel transmitted earlier in the time domain, and determine whether the remaining UL channels except for the removed UL channel meet the multiplexing timeline condition. For example, the UE may perform a timeline check for N UL channels (where N is an integer greater than or equal to 2). When the multiplexing timeline condition is not satisfied as a result of the check, the N UL channels may be sequentially removed, starting with a channel transmitted earlier in the time domain. Accordingly, UCI/channel transmission may be performed in consideration of the difference in time between the start symbol of the UL channel transmitted earlier among the remaining UL channels (that is, channels transmitted for the x-th time (where x is an integer greater than or equal to 2) among the multiple UL channels) except for the removed UL channel among the multiple UL channels overlapping in the time domain and the last symbol of the PDSCH associated with the multiple UL channels and/or the difference in time between the start symbol of a UL channel transmitted earlier among the remaining UL channels and the last symbol of the PDCCH (for the purpose of scheduling the PDSCH, scheduling the PUSCH and releasing the SPS PDSCH).

In this case, the channel to be removed may be a channel having a UCI type and/or channel-related element of the lower priority. For example, URLLC UCI may have a higher priority than eMBB UCI. In this case, the timeline check may be performed based on the remaining UL channels with the UL channel related to the eMBB UCI being removed.

Alternatively, the UE may continue to sequentially remove UL channels overlapping in the time domain one by one starting with a channel transmitted earlier than the others until a channel (e.g., a URLLC channel) having a UCI type and/or channel-related element of a specific priority becomes a target of the timeline check. For example, the channel having the channel-related element of the specific priority may be a channel having the highest priority.

Alternatively, the UE may continue to sequentially remove UL channels overlapping in the time domain one by one starting with a channel transmitted earliest among the multiple UL channels overlapping in the time domain until the difference in time between the start symbol of a channel transmitted earlier for the x-th time among the multiple UL channels overlapping in the time domain and the last symbol of the PDSCH associated with the multiple UL channels and/or the difference in time between the start symbol of a channel transmitted earlier for the x-th time among the multiple UL channels overlapping in the time domain and the last symbol of the PDCCH (for the purpose of scheduling the PDSCH, scheduling the PUSCH, and releasing the SPS PDSCH) becomes larger than a pre-defined/agreed/configured/indicated difference in time (that is, until the multiplexing timeline condition is satisfied).

The UCI of a channel removed in the timeline check may be excluded from the multiplexing target. That is, transmission of the UCI of the channel removed in the timeline check may be dropped (or delayed).

According to another implementation of the present disclosure, in the timeline check for UCI/PUSCH multiplexing of UL channels having different priorities, and/or channel-related elements, a rule may be defined to perform the timeline check for each priority, and/or channel-related element, and/or UCI type (or group). Specifically, when a high-priority UL channel (e.g., PUCCH or PUSCH) overlap in time with a low-priority UL channel (e.g., PUCCH or PUSCH), the timeline check may be performed on the UL channels for each priority, respectively.

For example, UCI/channel transmission may be performed in consideration of the difference in time between the earliest time among UL channels of the same priority (e.g., the highest priority or the lowest priority) overlapping with each other in time, that is, the start symbol of the channel transmitted earlier than the others in the time domain and the last symbol of the channel transmitted later between the PDSCH triggering the PUCCH/PUSCH of the priority or the PDCCH for scheduling the PUCCH/PUSCH of the priority (or the PDCCH for the purpose of releasing the SPS PDSCH). Here, the PDSCH triggering the PUCCH/PUSCH may mean, for example, a PDSCH associated with a HARQ-ACK feedback when the HARQ-ACK feedback is transmitted on the PUCCH/PUSCH.

In the present disclosure, the priority may be configured through a higher layer signal, may be explicitly indicated through a specific field of DCI, may be configured and distinguished in the search space to which the PDCCH (for scheduling DL/UL data) belongs (e.g., a high or low priority may be configured for each search space), may be configured and distinguished in a CORESET to which the PDCCH (for scheduling DL/UL data) belongs (e.g., a high or low priority may be configured for each CORESET), may be distinguished by RNTI (e.g., RNTI x=high priority, RNTI y=low priority), may be tied to and distinguished by a DCI format (e.g., DCI format x=high priority, DCI format y=low priority), or may be distinguished by CRC masking of the PDCCH.

Figure 19:
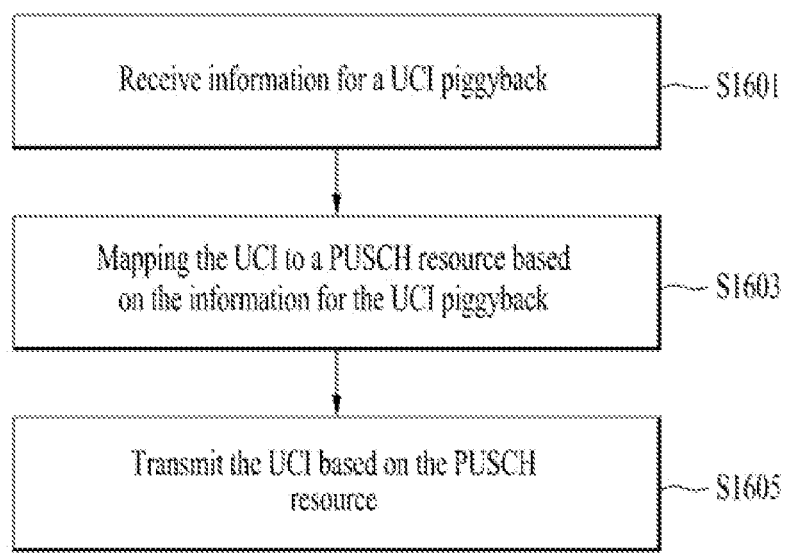
FIG. 19 is a flowchart of an operation of a UE related to UCI multiplexing according to another example of the present disclosure.
Figure 20:
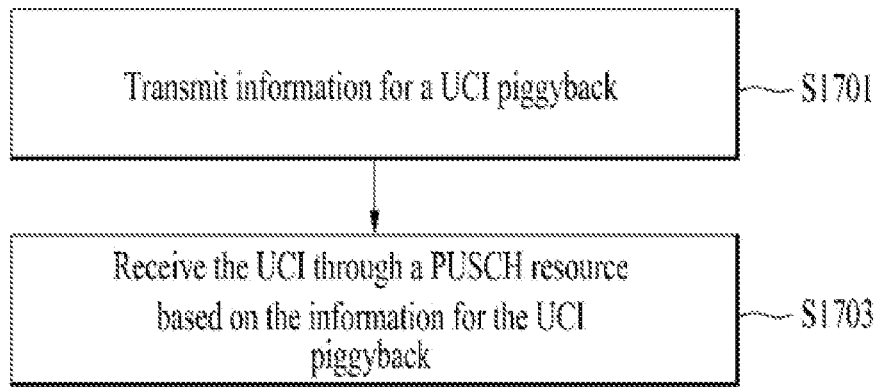
FIG. 20 is a flowchart of an operation of a BS related to UCI multiplexing according to another example of the present disclosure.

FIG. 19 is a flowchart of an operation of a UE related to UCI multiplexing according to another example of the present disclosure, and FIG. 20 is a flowchart of an operation of a BS related to UCI multiplexing according to another example of the present disclosure.

The operations of the UE and the BS of FIGS. 19 and 20 may be performed based on various implementations of Examples 1-3 described above.

Referring to FIG. 19, in S1601, the UE may receive configuration of a piggyback operation for each UCI type and/or channel-related element of UCI (i.e., each characteristic of the UCI) from the BS. Receiving the configuration of the piggyback operation may be receiving from the BS information on the piggyback operation defined for each UCI type and/or channel-related element of UCI. In S1603, the UE may map the UCI to a PUSCH resource based on the configured piggyback operation. In S1605, the UE may transmit the UCI through a PUSCH resource.

Referring to FIG. 20, in S1701, the BS may configure a piggyback operation for the UE for each UCI type and/or channel-related element of UCI (i.e., each characteristic of the UCI). In S1703, the BS may receive the UCI (i.e., the UCI mapped to the PUSCH resource) on the PUSCH from the UE based on the piggyback operation.

Example 1-4

If a separate independent parameter is configured/operated for a different channel-related element or each codebook corresponding to the channel-related element, a parameter (e.g., MaxCodeRate, simultaneousHARQ-ACK-CSI, nrofSlots) to be used for a specific UCI type (e.g., CSI/SR) to perform transmission may be ambiguous. In addition, when the specific UCI and a UCI of a different type are multiplexed into one channel, a parameter corresponding to a channel-related element or a codebook corresponding to the channel-related element on which determination of a new PUCCH resource is based may be determined based on any one of options 1 to 7 disclosed below or a combination of some/all of options 1 to 7.

* Option 1

In option 1, a parameter corresponding to a higher priority channel-related element or a codebook corresponding to the channel-related element may be applied to transmission of a specific UCI type. This may be intended to apply a parameter targeting a higher transmission reliability requirement to ensure certain transmission reliability even after multiplexing.

* Option 2

In option 2, a parameter corresponding to a lower priority channel-related element or a codebook corresponding to the channel-related element may be applied to transmission of a specific UCI type. This may be intended to apply a parameter related to a PUCCH resource set corresponding to a lower priority service for which a PUCCH resource is expected to be configured targeting a larger payload, or corresponding to a codebook corresponding to the lower priority service because multiplexing will increase the payload.

* Option 3

In option 3, for a specific UCI type (e.g., CSI/SR), a parameter corresponding to a predefined specific channel-related element or a codebook corresponding to the channel-related element may be applied.

* Option 4

In option 4, the final PUCCH resource may be determined by applying a smaller value (e.g., the smallest value) among the parameters (e.g., MaxCodeRate) configured for each channel-related element or each codebook corresponding to the channel-related element.

* Option 5

In option 5, the final PUCCH resource may be determined by individually applying a parameter (e.g., MaxCodeRate) configured for each channel-related element or each codebook corresponding to the channel-related element to each UCI. This operation may be more useful when separate coding is applied in multiplexing UCIs having different channel-related elements or codebooks corresponding to the channel-related elements.

* Option 6

In option 6, when multiple UCIs are multiplexed into one channel, a (different) maximum coding rate may be independently set for each combination of channel-related elements or codebooks corresponding to the channel-related elements. As an example, a maximum coding rate may be independently set for each of the combinations of {eMBB+eMBB}, {eMBB+URLLC}, and {URLLC+URLLC}. This operation may be more useful when separate coding is applied in multiplexing UCIs having different channel-related elements or codebooks corresponding to the channel-related elements.

Alternatively, a PUCCH resource/PUCCH resource set/K1 set/power control parameter/maxPayloadSize may be independently configured for each combination of channel-related elements or codebooks corresponding to the channel-related elements. For example, the PUCCH resource/PUCCH resource set/K1 set/power control parameter/maxPayloadSize may be independently configured for each of the combinations of {eMBB+eMBB}, {eMBB+URLLC}, and {URLLC+URLLC}. The PUCCH resource/PUCCH resource set/K1 set/power control parameter/maxPayloadSize may be independently configured only when the multiplexing condition (e.g., timeline) of UCI(s) and/or PUSCH(s) having different priorities is satisfied. Here, maxPayloadSize may indicate the maximum number of UCI information bits in UCI transmission through a PUCCH resource.

* Option 7

In option 7, when multiple UCIs are multiplexed into one channel, a (different) maximum coding rate may be independently set according to each combination of a first PUCCH selected as a final container of the multiplexed UCI and a remaining second PUCCH other than the final container. As an example, a maximum coding rate may be set for each service type combination of the first PUCCH and the second PUCCH (e.g., {eMBB, eMBB}, {eMBB, URLLC}, {URLLC, eMBB}, {URLLC, URLLC}) and the maximum coding rate corresponding to the combination may be applied in multiplexing.

Alternatively, a PUCCH resource/PUCCH resource set/K1 set/power control parameter/maxPayloadSize may be configured independently according to a combination of the first PUCCH and the second PUCCH. For example, for each of the combinations of {eMBB, eMBB}, {eMBB, URLLC}, {URLLC, eMBB}, and {URLLC, URLLC}, which are service type combinations of the first PUCCH and the second PUCCH, a PUCCH resource/PUCCH resource set/K1 set/power control parameter/maxPayloadSize may be configured independently. The a PUCCH resource/PUCCH resource set/K1 set/power control parameter/maxPayloadSize may be configured only when the multiplexing condition (e.g., timeline) of UCI(s) and/or PUSCH(s) having different priorities is satisfied.

2. Subslot-Based HARQ-ACK Feedback

For the purpose of low-latency communication, multiple subslots may be defined in a slot, and HARQ-ACK feedback may be performed more quickly on a subslot-by-subslot basis. In configuring a PUCCH resource for HARQ-ACK feedback transmission, it may be determined whether to allow a PUCCH resource to be allocated across a subslot boundary (e.g., a PUCCH resource spanning over multiple subslots in the time domain, that is, including a subslot boundary). This situation may need to be allowed in order to guarantee the coverage of PUCCH transmission. On the other hand, in order to avoid performance degradation due to an additional operation (e.g., multiplexing or drop) when PUCCH resources allocated to multiple subslots respectively overlap with each other, it may need to disallow the situation.

According to an example of the present disclosure, even when a PUCCH resource including a subslot boundary is allowed to be allocated, disallowing the allocation across a slot boundary may be useful for efficient scheduling of the BS and uplink power control of the UE. Accordingly, a rule may be defined such that, when a PUCCH resource configured for a UE in a specific subslot crosses a slot boundary, the last symbol of the PUCCH resource is reinterpreted as the last symbol of the corresponding slot. In particular, the rule may be more useful when resource allocation of PUCCH resources is configured in common for multiple subslots (e.g., one start symbol and symbol duration are configured/indicated and the allocation is interpreted based on the first symbol of every subslot to allocate a PUCCH resource). As an example, when a slot is divided into 7 subslots and PUCCH is allocated to the four-symbol interval from the first symbol of each subslot, the PUCCH resource for the seventh subslot, the last subslot, may not be allocated across the slot boundary. Instead, the PUCCH may be configured for the two-symbol interval from the thirteenth symbol to the fourteenth symbol (the last symbol) in the slot.

Configuring the PUCCH in a clipped PUCCH (PUCCH) resource (e.g., the PUCCH resource of the last seventh subslot shortened to the two-symbol interval) shorter than the duration configured as above may degrade performance. In order to compensate for this, a rule may be defined such that transmission is performed using a transmit power higher than that of PUCCH transmitted in another subslot. This may mean that a power offset is predetermined, configured through a higher layer signal, or indicated through DCI, compared to PUCCH transmitted in another subslot. Alternatively, to allow power boosting compared to PUCCH transmitted in another subslot, a rule may be defined such that a different open-loop parameter (e.g., P_0), and/or a different TPC command value and/or a different TPC value range are applied.

Figure 21:
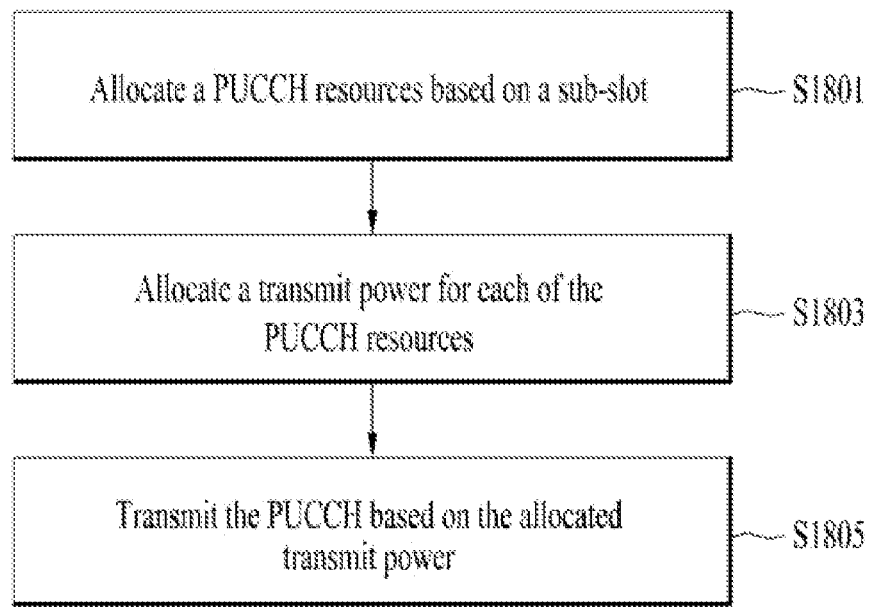
FIG. 21 is a flowchart of an operation of a UE for PUCCH transmission according to an example of the present disclosure.
Figure 22:
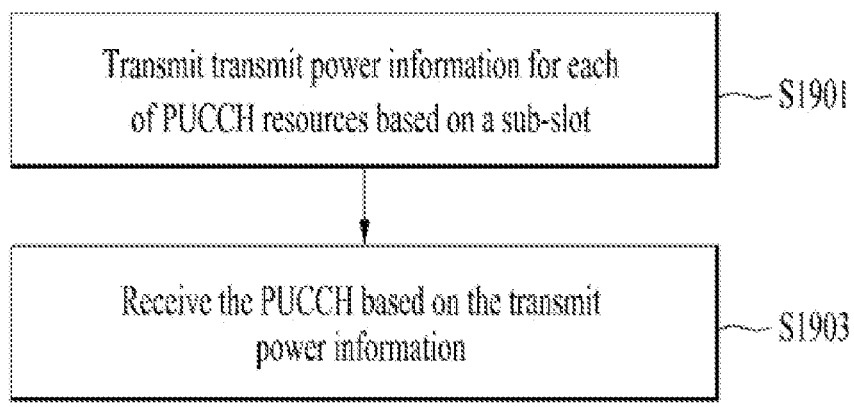
FIG. 22 is a flowchart of an operation of a BS for PUCCH transmission according to an example of the present disclosure.

FIG. 21 is a flowchart of an operation of a UE for PUCCH transmission according to an example of the present disclosure, and FIG. 22 is a flowchart of an operation of a BS for PUCCH transmission according to an example of the present disclosure.

The UE operation and the BS operations of FIGS. 21 and 22 may be performed based on the various examples disclosed in relation to the subslot-based HARQ-ACK feedback described above.

Referring to FIG. 21, in S1801, the UE may be allocated subslot-based PUCCH resources from the BS. In S1803, the UE may be allocated transmit power for each of the allocated PUCCH resources from the BS. In S1805, the UE may transmit PUCCH on the subslot-based PUCCH resources based on the allocated transmit power.

Referring to FIG. 22, in S1901, the UE may configure/indicate transmit power for each of the subslot-based PUCCH resources to the UE. In S1903, the UE may receive the PUCCH transmitted from the UE based on the transmit power.

3. UL Power Control for Multiplexing

Example 3-1

Various examples of UL power control operation performed when multiple UCIs (e.g., HARQ-ACK/CSI/SR) having different channel-related elements are transmitted on one channel (or multiple channels) (e.g., PUCCH/PUSCH) are disclosed in Example 3-1. The BS may receive a UL channel in anticipation of the UL power control operation of the UE. Hereinafter, multiple PUCCHs having different channel-related elements may be referred to as type-1 PUCCH and type-2 PUCCH, respectively.
* Option 1

In option 1, the UE may apply a TPC command in a DCI for scheduling transmission of each of type-1 and type-2 PUCCHs (e.g., DCI for scheduling a PDSCH associated with HARQ-ACK transmission) to a TPC accumulation loop corresponding to transmission of each of the type-1 and type-2 PUCCHs, and determine larger power between the derived transmit powers as the power of PUCCH transmission newly selected for multiplexing of the type-1 PUCCH and the type-2 PUCCH. Alternatively, the UE may select a larger power between the powers corresponding to the respective types of TPC accumulation loops prior to TPC command accumulation, and apply the corresponding loop and TPC command to determine the power as the power of PUCCH transmission newly selected for multiplexing of the type-1 PUCCH and type-2 PUCCH.
* Option 2

In option 2, the UE may select a larger value between open-loop parameters (e.g., P_0) configured for the type-1 and type-2 PUCCHs, and determine the power of PUCCH transmission newly selected for multiplexing of the type-1 PUCCH and the type-2 PUCCH based on a TPC accumulation loop and TPC command corresponding to PUCCH transmission of the type corresponding to the selected value.
* Option 3

In option 3, the UE may determine the power of container PUCCH transmission by applying a configured/indicated TPC loop and TPC command to a container PUCCH on which UCIs included in type-1 and type-2 PUCCHs are multiplexed and transmitted. As an example, when UCI of type-1 PUCCH and UCI of type-2 PUCCH are multiplexed and transmitted on the type-2 PUCCH, the UE may determine the transmit power by applying a loop and TPC command corresponding to type-2 PUCCH transmission.
* Option 4

In option 4, a separate TPC accumulation loop may be defined for each of {type-1 PUCCH} (i.e., transmitting only type-1 PUCCH), {type-2 PUCCH} (i.e., transmitting only type-2 PUCCH), {type-1+type-2 PUCCH multiplexing}. When the type-1 and type-2 PUCCHs are multiplexed and transmitted on one PUCCH, the TPC command may be a TPC command in the DCI for scheduling PUCCH transmission of the type having the higher priority (e.g., DCI for scheduling PDSCH that triggers HARQ-ACK transmission), or may be a TPC command derived by options 1 to 3 above.

Example 3-2

Disclosed in Example 3-2 are various examples of the UL power control operation of the UE performed when one or more UCIs having a specific channel-related element and/or UCI type are transmitted by piggybacking on one PUSCH (or multiple PUSCHs) having a different channel-related element and/or UCI type. The BS may receive a UL channel in anticipation of the UL power control operation of the UE. Hereinafter, the PUCCH and PUSCH having different channel-related elements may be referred to as type-1 PUCCH and type-2 PUSCH, respectively.
* Option 1

In option 1, the UE may determine the PUSCH transmit power by applying the TPC command in the UL grant DCI for scheduling a PUSCH to the TPC accumulation loop of the PUSCH. Specifically, when type-1 has a higher priority than type-2, the UE may add a separate offset value to the PUSCH transmit power, thereby determining the final PUSCH transmit power. The offset value may be predefined/predetermined, configured through a higher layer signal, or indicated through DCI.

The offset value may be temporarily applied. For example, in the case of type-2 PUSCH transmission including type-1 PUCCH in scheduling after applying the separate offset value (i.e., transmitting the type-2 PUSCH with the type-1 PUCCH piggybacking thereon), TPC accumulation may be performed based on the previous value of the TPC accumulation loop (that is, PUSCH transmit power obtained by applying a separate offset value). On the other hand, in the case of type-2 PUSCH transmission without type-1 PUCCH (i.e., transmitting only type-2 PUSCH), TPC accumulation may be performed based on a value obtained by subtracting the separate offset value from the previous value of the TPC accumulation loop.

Also, in option 1, a rule may be defined such that, when type-1 has a higher priority than type-2, a value range of a separate TPC command is applied.
* Option 2

In option 2, the UE may select a larger value between open-loop parameters (e.g., P_0) configured for type-1 PUSCH and type-2 PUSCH, and select a TPC accumulation loop corresponding to PUSCH transmission of the type corresponding to the selected value. As an example, when the selected type is type-2, the UE may apply the TPC command in the UL grant for scheduling the type-2 PUSCH. As another example, when the selected type is type-1, the UE may apply the TPC command in the UL grant for scheduling the type-2 PUSCH, or may additionally apply a separate offset value when the TPC command is applied. Alternatively, the UE may ignore the TPC command in the UL grant for scheduling the type-2 PUSCH and/or apply the TPC in the DCI for scheduling the type-1 PUCCH transmission (e.g., the DCI for scheduling the PDSCH triggering HARQ-ACK transmission).
* Option 3

In option 3, the UE may select a larger value between the open-loop parameters (e.g., P_0) configured for type-1 PUCCH and type-2 PUSCH, and apply a TPC accumulation loop and TPC command corresponding to transmission of the type corresponding to the selected value to the final channel transmission. Here, the final container channel on which the type-1 PUCCH and the type-2 PUSCH are to be multiplexed and transmitted may also be selected based on option 3.

Example 3-3

When REs corresponding to different channel-related elements and/or UCI types are mixed in one OFDM/SC-FDMA symbol, the UE may unequally allocate power for each RE (or group) such that more power may be applied to an RE corresponding to a type of the higher priority.

Specifically, the ratio (or weight) of powers each allocated to different types of REs (or groups) may be predefined, configured through a higher layer signal, or indicated through DCI. As an example, when a UCI RE and a UL-SCH RE coexist in the same symbol as type-1 UCI piggybacks on type-2 PUSCH, x % of the total power of the symbol may be allocated to the UCI RE, and y % thereof may be allocated to the UL-SCH RE. In this case, if type-1 has a higher priority, x may be greater than y.

In addition, the lower limit of power allocated to the RE (or group) of the type having the higher priority may be predefined, configured through a higher layer signal, or indicated through DCI. This may be intended to ensure that the power allocated to the RE (or group) of the type having the higher priority is higher than or equal to a certain level.

Figure 23:
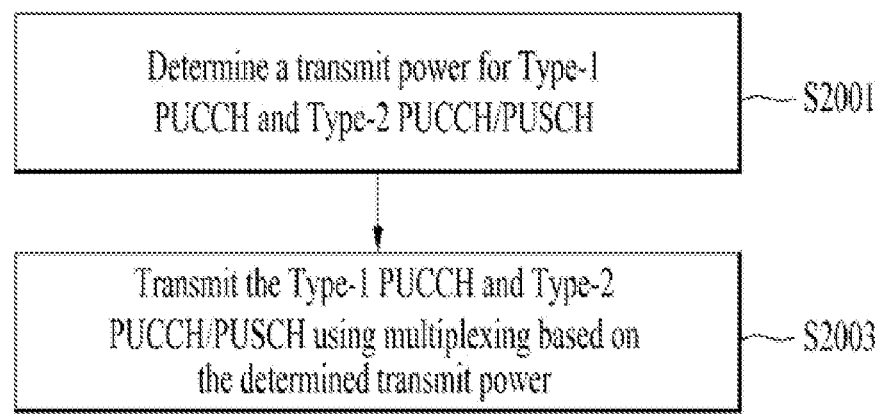
FIG. 23 is a flowchart of a PUCCH/PUSCH transmission method for a UE according to an example of the present disclosure.
Figure 24:
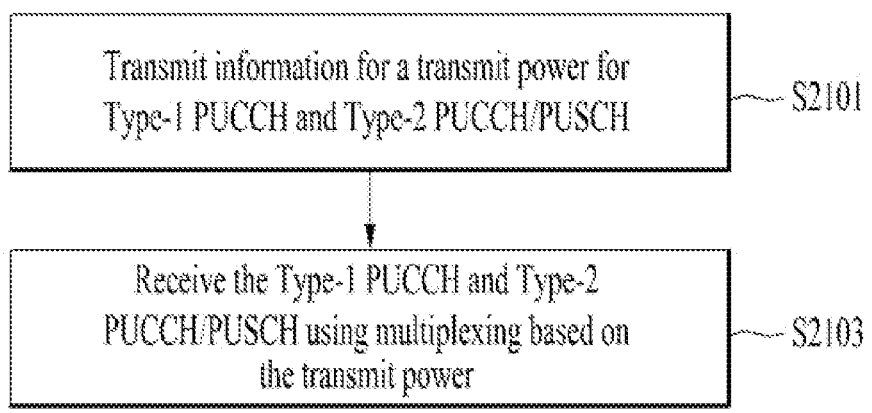
FIG. 24 is a flowchart of a PUCCH/PUSCH reception method for a BS according to an example of the present disclosure.

FIG. 23 is a flowchart of a PUCCH/PUSCH transmission method for a UE according to an example of the present disclosure, and FIG. 24 is a flowchart of a PUCCH/PUSCH reception method for a BS according to an example of the present disclosure.

The implementation of the UE operation and BS operations in FIGS. 23 and 23 may be based on various examples disclosed in 3. UL Power Control for Multiplexing. In addition, the transmit power for multiplexing of the type-1 PUCCH and the type-2 PUCCH/PUSCH may be determined as any one value according to Examples 3-1 and 3-2, may be individually configured for each RE or RE group, or may be set as a ratio between powers allocated to multiple REs or multiple RE groups.

Referring to FIG. 23, in S2001, the UE may determine transmit powers for type-1 PUCCH and type-2 PUCCH/PUSCH. In S2003, the UE may multiplex the type-1 PUCCH and the type-2 PUCCH/PUSCH based on the determined transmit powers and transmit the same to the BS.

Referring to FIG. 24, in S2101, the BS may transmit information related to transmit powers for the type-1 PUCCH and type-2 PUCCH/PUSCH to the UE. In S2103, the BS may receive the multiplexed type-1 PUCCH and type-2 PUCCH/PUSCH from the UE.

Figure 25:
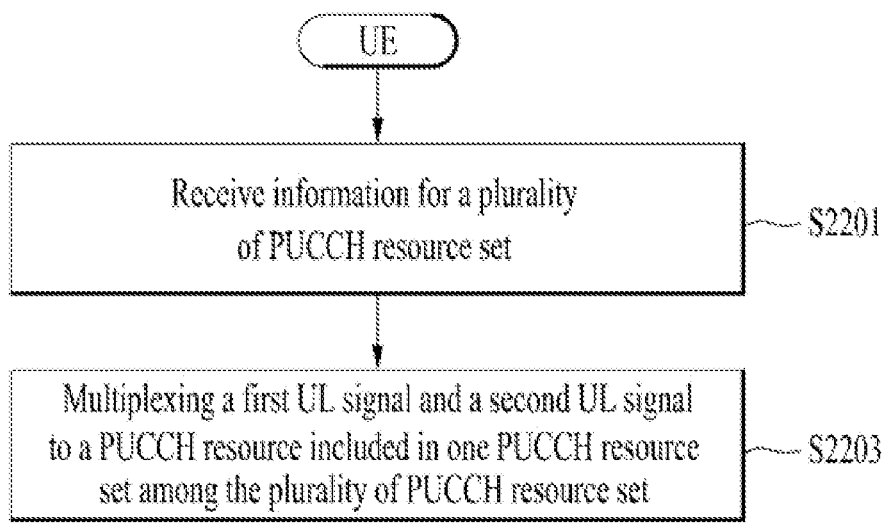
FIG. 25 is a flowchart of an uplink signal transmission method for a UE according to an example of the present disclosure.

FIG. 25 is a flowchart of an uplink signal transmission method for a UE according to an example of the present disclosure.

Referring to FIG. 25, in 52201, the UE may receive information about a plurality of PUCCH resource sets from the BS. Here, the plurality of PUCCH resource sets may be configured to have a priority.

In S2203, based on overlapping of a first PUCCH resource related to a first uplink signal and a second PUCCH resource related to a second uplink signal in the time domain, the UE may multiplex the first uplink signal and the second uplink signal on a PUCCH resource included in one PUCCH resource set among the plurality of PUCCH resource sets. Here, the multiplexing may refer to an operation of transmitting a plurality of UL signals on a common physical layer UL channel as described above.

Here, the one PUCCH resource set may be a PUCCH resource set having the highest priority among the plurality of PUCCH resource sets.

Alternatively, the one PUCCH resource set may be a PUCCH resource set related to a payload size of an uplink signal in which the first uplink signal and the second uplink signal are multiplexed among the plurality of PUCCH resource sets.

Alternatively, the plurality of PUCCH resource sets may be configured to have a maximum code rate. In this case, the maximum code rate may be set to have a smaller value as the priority becomes higher.

The plurality of PUCCH resource sets may each be related to a range of the payload size of the uplink signal. In this case, the range of the payload size of the uplink signal may be configured based on the priority. For example, the range of the payload size may be configured to include a smaller payload size as the priority becomes higher.

In addition, at least one of the PUCCH resource, the plurality of PUCCH resource sets, a timing indicator set between the PUCCH resource and a PDSCH resource related to the PUCCH resource, a power control parameter related to the PUCCH resource, and a maximum payload related to the PUCCH resource may be configured differently for each combination of the first uplink signal and the second uplink signal.

Here, the uplink signal transmission method for the UE may further include receiving a downlink signal containing resource indicator information. Accordingly, the PUCCH resource (which is one of a plurality of PUCCH resources included in the one PUCCH resource set) may be indicated based on the resource indicator information among the plurality of PUCCH resources included in the one PUCCH resource set.

Figure 26:
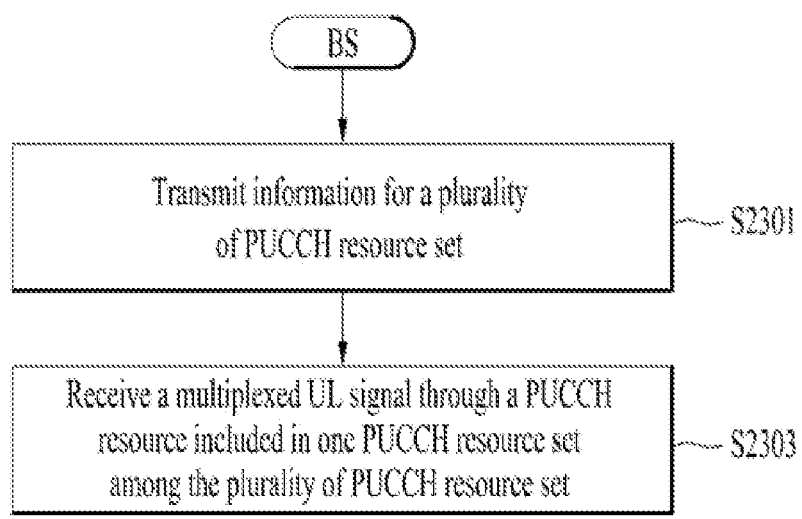
FIG. 26 is a flowchart of an uplink reception method for a BS according to an example of the present disclosure.

FIG. 26 is a flowchart of an uplink reception method for a BS according to an example of the present disclosure. In the following description, a detailed description of parts overlapping with FIG. 25 will be skipped.

Referring to FIG. 26, in S2301, the BS may transmit information about a plurality of PUCCH resource sets to the UE. Here, the plurality of PUCCH resource sets may be configured to have a priority.

In S2303, based on overlapping of a first PUCCH resource related to a first uplink signal and a second PUCCH resource related to a second uplink signal in the time domain, the BS may receive an uplink signal in which the first uplink signal and the second uplink signal are multiplexed through a PUCCH resource included in one PUCCH resource set among the plurality of PUCCH resource sets.

Here, the one PUCCH resource set may be a PUCCH resource set having the highest priority among the plurality of PUCCH resource sets.

In the present disclosure described above, a channel-related element for a specific channel/UCI may be configured through a higher layer signal, explicitly indicated through a specific field of DCI, distinguished through a search space to which a PDCCH for scheduling DL/UL data belongs, distinguished by a CORESET to which a PDCCH for DL/UL scheduling belongs, distinguished by an RNTI, distinguished by a DCI format, or distinguished through CRC masking of the PDCCH. Various examples of the present disclosure described above may be applied to handling of channels/UCIs of multiple types distinguished by a specific field of the DCI/ a search space to which the PDCCH belongs/a CORESET to which the PDCCH belongs/RNTI/DCI format/CRC masking of the PDCCH without explicit distinction of channel-related elements for channels/UCIs. Also, a UCI/channel corresponding to a specific channel-related element and/or a UCI type may be replaced with a specific UCI/channel distinguished by a specific field of DCI/a search space to which the PDCCH belongs/a CORESET to which the PDCCH belongs/RNTI/DCI format/CRC masking of the PDCCH among the multiple types of UCIs/channels, and may be applied to various examples of the present disclosure.

The examples of the present disclosure are provided so that those skilled in the art related to the present disclosure may implement and practice the present disclosure. Although the description has been made with reference to the examples of the present disclosure, those skilled in the art may variously modify and change the examples of the present disclosure. Accordingly, the present disclosure is not intended to be limited to the examples set forth herein but is to be accorded the widest scope consistent with the principles and novel features disclosed herein.

INDUSTRIAL APPLICABILITY

The implementations of the present disclosure may be employed for a base station, a user equipment, and other apparatuses in a wireless communication system.

The invention claimed is:

1. A method by a user equipment, the method comprising:
receiving configuration information
regarding a plurality of PUCCH resource sets, wherein the configuration information includes first configuration information regarding first PUCCH resource sets related to low priority and second configuration information regarding second PUCCH resource sets related to high priority; and
based on overlapping of a first PUCCH resource related to first uplink control information (UCI) of the low priority and a second PUCCH resource related to second UCI of the high priority in a time domain, multiplexing the first UCI and the second UCI on a PUCCH resource included in one PUCCH resource set among the plurality of PUCCH resource sets,
wherein each of the plurality of PUCCH resource sets is related to a range of a payload size, and
wherein the one PUCCH resource set is one among the second PUCCH resource sets and determined based on a size of the first UCI and a size of the second UCI.

2. The method of claim 1, further comprising:
receiving a downlink signal containing resource indicator information,
wherein the PUCCH resource is determined based on the resource indicator information among a plurality of PUCCH resources included in the one PUCCH resource set.

3. The method of claim 1, wherein the configuration information includes a first maximum code rate related to the low priority and a second maximum code rate related to the high priority, and
wherein multiplexing the first UCI and the second UCI comprises: applying the first maximum code rate to the first UCI and the second maximum code rate to the second UCI.

4. A user equipment comprising:
at least one transceiver;
at least one processor; and
at least one memory operatively coupled to the at least one processor to store at least one instruction causing the at least one processor to perform operations, the operations comprising:

receiving configuration information regarding a plurality of PUCCH resource sets, wherein the configuration information includes first configuration information regarding first PUCCH resource sets related to low priority and second configuration information regarding second PUCCH resource sets related to high priority; and
based on overlapping of a first PUCCH resource related to first uplink control information, UCI, of the low priority and a second PUCCH resource related to second UCI of the high priority in a time domain, multiplexing the first UCI and the second UCI on a PUCCH resource included in one PUCCH resource set among the plurality of PUCCH resource sets,
wherein each of the plurality of PUCCH resource sets is related to a range of a payload size,
wherein the one PUCCH resource set is one among the second PUCCH resource sets and determined based on a size of the first and a size of the second UCI.

5. The user equipment of claim 4, wherein the configuration information includes a first maximum code rate related to the low priority and a second maximum code rate related to the high priority, and
wherein multiplexing the first UCI and the second UCI comprises: applying the first maximum code rate to the first UCI and the second maximum code rate to the second UCI.

6. The user equipment of claim 4, wherein the operations further comprise:
receiving a downlink signal containing resource indicator information,
wherein the PUCCH resource is determined based on the resource indicator information among a plurality of PUCCH resources included in the one PUCCH resource set.

7. A base station comprising:
at least one processor; and
at least one memory operatively coupled to the at least one processor to store at least one instruction causing the at least one processor to perform operations, the operations comprising:
transmitting configuration information regarding a plurality of PUCCH resource sets, wherein the configuration information includes first configuration information regarding first PUCCH resource sets related to low priority and second configuration information regarding second PUCCH resource sets related to high priority; and
based on overlapping of a first PUCCH resource related to first uplink control information, UCI, of the low priority and a second PUCCH resource related to second UCI of the high priority in a time domain, receiving an uplink signal through a PUCCH resource included in one PUCCH resource set among the plurality of PUCCH resource sets, the uplink signal being formed by multiplexing the first UCI and the second UCI,
wherein each of the plurality of PUCCH resource sets is related to a range of a payload size.
wherein the one PUCCH resource set is one among the second PUCCH resource sets and determined based on a size of the first and a size of the second UCI.

8. The base station of claim 7, wherein the configuration information includes a first maximum code rate related to the low priority and a second maximum code rate related to the high priority, and wherein multiplexing the first UCI and the second UCI comprises: applying the first maximum code rate to the first UCI and the second maximum code rate to the second UCI.

9. The base station of claim 7, wherein the operations further comprise:

transmitting a downlink signal containing resource indicator information, wherein the PUCCH resource is informed based on the resource indicator information among a plurality of PUCCH resources included in the one PUCCH resource set.

* * * * *